(12) United States Patent
Fujime et al.

(10) Patent No.: US 11,168,633 B2
(45) Date of Patent: Nov. 9, 2021

(54) ENGINE UNIT INCLUDING INTERNAL COMBUSTION ENGINE AND MISFIRE DETECTION DEVICE, AND VEHICLE

(71) Applicants: YAMAHA HATSUDOKI KABUSHIKI KAISHA, Iwata (JP); DENSO CORPORATION, Kariya (JP)

(72) Inventors: Yoko Fujime, Iwata (JP); Minoru Hotta, Kariya (JP); Yoshihiko Nonogaki, Kariya (JP)

(73) Assignees: YAMAHA HATSUDOKI KABUSHIKI KAISHA, Iwata (JP); DENSO CORPORATION, Kariya (JP)

( * ) Notice: Subject to any disclaimer, the term of this patent is extended or adjusted under 35 U.S.C. 154(b) by 151 days.

(21) Appl. No.: 16/179,859

(22) Filed: Nov. 2, 2018

(65) Prior Publication Data

US 2019/0136759 A1    May 9, 2019

(30) Foreign Application Priority Data

Nov. 2, 2017   (JP) .............................. JP2017-212402

(51) Int. Cl.
*F02D 41/14*     (2006.01)
*F02B 77/08*     (2006.01)
(Continued)

(52) U.S. Cl.
CPC ........ *F02D 41/1498* (2013.01); *F02B 77/085* (2013.01); *F02D 29/02* (2013.01);
(Continued)

(58) Field of Classification Search
CPC ........ F02B 77/085; F02D 29/02; F02D 35/02; F02D 41/0097; F02D 41/1498;
(Continued)

(56) References Cited

U.S. PATENT DOCUMENTS 5,239,473 A * 8/1993 Ribbens ................. G01M 15/11
                                                            123/436
5,287,736 A * 2/1994 Nakayama ............. G01M 15/11
                                                            73/114.04

(Continued)

FOREIGN PATENT DOCUMENTS

| JP | H0719103 A | 1/1995 |
|----|------------|--------|
| JP | H09-112334 A | 4/1997 |
| JP | 2000-064901 A | 3/2000 |

*Primary Examiner* — Hung Q Nguyen
*Assistant Examiner* — Mark L. Greene
(74) *Attorney, Agent, or Firm* — Rabin & Berdo, P.C.

(57) ABSTRACT

An engine unit includes an internal combustion engine and a misfire detection device. The misfire detection device includes a rough road traveling determination unit that: (a) determines a rough road traveling state based on a distribution state of a crankshaft rotation speed fluctuation physical quantity acquired by a crankshaft rotation speed fluctuation physical quantity acquisition unit, or (b) includes a vehicle traveling state detection unit for detecting a physical quantity in relation to a vehicle traveling state except the crankshaft rotation speed fluctuation physical quantity, and determines a rough road traveling state based on a detection result obtained by the vehicle traveling state detection unit; and suspends a determination of a misfire in the internal combustion engine based on a determination result obtained by the rough road traveling determination unit.

6 Claims, 9 Drawing Sheets

(51) Int. Cl.
*F02D 29/02* (2006.01)
*F02D 35/02* (2006.01)
*G01M 15/11* (2006.01)
*F02D 41/00* (2006.01)

(52) U.S. Cl.
CPC ......... *F02D 35/02* (2013.01); *F02D 41/0097* (2013.01); *G01M 15/11* (2013.01); *F02D 2200/101* (2013.01); *F02D 2200/1015* (2013.01); *F02D 2200/702* (2013.01)

(58) Field of Classification Search
CPC ....... F02D 2200/101; F02D 2200/1012; F02D 2200/1015; G01M 15/11
See application file for complete search history.

(56) References Cited

U.S. PATENT DOCUMENTS

| | | | |
|---|---|---|---|
| 5,381,688 A * | 1/1995 | Ikeda | G01B 5/28 73/105 |
| 5,499,537 A * | 3/1996 | Nakayama | G01M 15/11 701/111 |
| 5,504,682 A | 4/1996 | Shiraishi et al. | |
| 5,539,644 A * | 7/1996 | Ichikawa | G01M 15/11 123/436 |
| 5,633,456 A | 5/1997 | Stander | |
| 2004/0122585 A1 | 6/2004 | Aono et al. | |
| 2016/0222893 A1 | 8/2016 | Ohta | |
| 2017/0167952 A1 | 6/2017 | Hiroi et al. | |

* cited by examiner

ENGINE UNIT INCLUDING INTERNAL COMBUSTION ENGINE AND MISFIRE DETECTION DEVICE, AND VEHICLE

TECHNICAL FIELD

The present teaching relates to an engine unit including an internal combustion engine and a misfire detection device, and to a vehicle.

BACKGROUND ART

A misfire detection device of an internal combustion engine has been proposed capable of detecting a misfire based on a crankshaft rotation speed fluctuation not only when the rotation speed is low but also when the rotation speed is high (for example, Patent Literature 1 (PTL 1)).

In an internal combustion engine, the rotation speed of a crankshaft decreases after occurrence of a misfire, and the amount of the decrease in a low rotation speed region of the crankshaft is different from that in a high rotation speed region of the crankshaft. Specifically, a position (crank angle) of the nadir of a crankshaft rotation speed decrease in the high rotation speed region is located behind a position (crank angle) of the nadir of a crankshaft rotation speed decrease in the low rotation speed region. A return position where the crankshaft rotation speed returns from the nadir in the high rotation speed region to a normal state is also located behind a return position where the crankshaft rotation speed returns from the nadir in the low rotation speed region to a normal state. Thus, a conventional approach with a position (crank angle) of a misfire determination section fixed has a risk that the nadir position may deviate from the misfire determination section depending on a rotation region. There is also a risk that the nadir position may displace to the vicinity of a boundary of the misfire determination section. This deteriorates an accuracy of detection of a crankshaft rotation speed fluctuation amount, and therefore deteriorates a misfire detection accuracy.

In this respect, changing the position of the misfire determination section in accordance with the crankshaft rotation speed for the purpose of providing a high misfire detection accuracy over the entire rotation speed region has been proposed as disclosed in PTL 1. In addition, contriving a way to calculate a crankshaft rotation speed fluctuation amount for the purpose of providing a high misfire detection accuracy over the entire rotation speed region has been proposed (for example, Patent Literature 2 (PTL 2)).

CITATION LIST

Patent Literature

PTL 1: Japanese Patent Application Laid-Open No. H9-112334 (1997)
PTL 2: Japanese Patent Application Laid-Open No. 2000-64901

SUMMARY OF INVENTION

Technical Problem

Enhancing the misfire detection accuracy in a high load and high rotation speed region has been desired.

An object of the present teaching is to provide: an engine unit including a misfire detection device and an internal combustion engine capable of enhancing a misfire detection accuracy at a time of a high load and a high rotation speed while maintaining a misfire detection accuracy at a time of a low load and a low rotation speed, based on a crankshaft rotation speed fluctuation; and a vehicle.

Solution to Problem

The present inventors conducted studies based on a technical idea examining how to enhance a misfire detection accuracy in a high load and high rotation speed region as compared to in a low load and low rotation speed region. The present inventors eventually obtained the following findings (i) and (ii).

(i) Reducing a moment of inertia of an internal combustion engine can enhance a misfire detection accuracy in a high load and high rotation speed region as compared to in a low load and low rotation speed region. To be specific, the relationship of a misfire detection accuracy to a low load and low rotation speed region and a high load and high rotation speed region can be changed by changing a weight of a crankshaft.

(ii) Reducing the moment of inertia of the internal combustion engine to enhance a misfire detection accuracy in the high load and high rotation speed region as compared to in the low load and low rotation speed region, however, leads to a deterioration in a misfire detection accuracy in the low load and low rotation speed region when traveling on a rough road.

The present inventors conducted detailed studies about a deterioration in the misfire detection accuracy in a low load and low rotation speed region when traveling on a rough road, which deterioration is caused by enhancing the misfire detection accuracy in a high load and high rotation speed region as compared to in the low load and low rotation speed region.

First, it was found that the enhancement of the misfire detection accuracy in the high load and high rotation speed region is the following phenomenon. When the moment of inertia of the internal combustion engine is reduced, the interval between adjacent tails of a distribution of the crankshaft rotation speed fluctuation amount under a normal state (in a case of no misfire) and a distribution of the crankshaft rotation speed fluctuation amount in a case of a misfire occurring widens in the high load and high rotation speed region. Thus, the misfire detection accuracy in the high load and high rotation speed region can be enhanced. When the moment of inertia of the internal combustion engine is reduced, the interval between adjacent tails of a distribution of the crankshaft rotation speed fluctuation amount under a normal state and a distribution of the crankshaft rotation speed fluctuation amount in a case of a misfire occurring narrows and sometimes the tails overlap with each other, in the low load and low rotation speed region. When a vehicle equipped with such an internal combustion engine travels on a rough road, the interval between adjacent tails of a distribution of the crankshaft rotation speed fluctuation amount in a case of traveling on a rough road under a normal state and a distribution of the crankshaft rotation speed fluctuation amount in a case of a misfire occurring further narrows, and depending on circumstances, the distribution of the crankshaft rotation speed fluctuation amount in a case of traveling on a rough road under a normal state and the distribution of the crankshaft rotation speed fluctuation amount in a case of a misfire occurring may largely overlap each other. This makes it difficult to distinguish whether data in an overlap region is data in a case of traveling on a rough road under a normal state or data in a case of a misfire occurring. This deteriorates the misfire detection accuracy when the crankshaft in in a low rotation speed region.

The present inventors studied a method for separating a distribution of the crankshaft rotation speed fluctuation amount in a case of traveling on a rough road under a normal state from a distribution of the crankshaft rotation speed fluctuation amount in a case of a misfire occurring even if they overlapped each other. In the studies, the present inventors discovered that a data distribution in a case of traveling on a rough road under a normal state has a smaller height and a larger tail than those of a data distribution in a case of a misfire occurring, but the centers of the distributions are not largely different. The present inventors conceived of an idea (a) that even if a distribution of the crankshaft rotation speed fluctuation amount in a case of traveling on a rough road under a normal state overlaps a distribution of the crankshaft rotation speed fluctuation amount in a case of a misfire occurring, data in a case of a traveling on a rough road can be distinguished by comparing distribution states in adjacent regions. This is quite different from a technique of comparison against a threshold, and is a new technique discovered based on characteristics of a data distribution in a case of traveling on a rough road under a normal state. This makes it possible to enhance a misfire detection accuracy at a time of a high load and a high rotation speed while maintaining a misfire detection accuracy at a time of a low load and a low rotation speed, based on a crankshaft rotation speed fluctuation.

The present inventors also conceived of an idea (b) that a misfire detection accuracy at a time of a high load and a high rotation speed can be enhanced while a misfire detection accuracy at a time of a low load and a low rotation speed is maintained based on a crankshaft rotation speed fluctuation, by: reducing a moment of inertia of an internal combustion engine so that the interval, in a high load and high rotation speed region, between adjacent tails of a distribution of the crankshaft rotation speed fluctuation amount under a normal state and a distribution of the crankshaft rotation speed fluctuation amount in a case of a misfire occurring can be greater than the interval, in a low load and low rotation speed region, between adjacent tails of a distribution of the crankshaft rotation speed fluctuation amount under a normal state and a distribution of the crankshaft rotation speed fluctuation amount in a case of a misfire occurring; and combining a technique of detecting a misfire based on a crankshaft rotation speed fluctuation with a technique of detecting a rough road traveling state without using a crankshaft rotation speed fluctuation. The technique of detecting a rough road traveling state without using a crankshaft rotation speed fluctuation is not particularly limited, and conventionally known techniques are adoptable such as techniques disclosed in Japanese Patent Application Laid-Open No. 2015-134568, Japanese Patent Application Laid-Open No. 2015-90141, Japanese Patent Application Laid-Open No. 2001-287634, Japanese Patent Application Laid-Open No. 2006-347340, Japanese Translation of PCT International Application Publication No. JP-T-2002-521272, and the like.

The present teaching is an invention accomplished based on the above findings.

(1) An engine unit according to an aspect of the present teaching is an engine unit provided in a vehicle, including:

an internal combustion engine including a crankshaft and
a crank angle signal output unit that periodically outputs a crank angle signal in accordance with rotation of the crankshaft; and a misfire detection device including a crankshaft rotation speed fluctuation physical quantity acquisition unit and a misfire determination unit, the crankshaft rotation speed fluctuation physical quantity acquisition unit being configured to acquire a physical quantity in relation to the amount of fluctuation in a rotation speed of the crankshaft based on a signal from the crank angle signal output unit, the misfire determination unit being configured to determine a misfire state of the internal combustion engine based on the crankshaft rotation speed fluctuation physical quantity acquired by the crankshaft rotation speed fluctuation physical quantity acquisition unit, the internal combustion engine being configured such that
an interval between adjacent tails of a distribution of a crankshaft rotation speed fluctuation physical quantity under a normal state and a distribution of a crankshaft rotation speed fluctuation physical quantity in a case of a misfire occurring tends to widen as a load increases and to narrow as a crankshaft rotation speed increases, and
a low load and low rotation speed region in which the interval between the adjacent tails is relatively narrow and a high load and high rotation speed region in which the interval between the adjacent tails is relatively wide are present in a range of the crankshaft rotation speed and the load during traveling of the vehicle, the misfire detection device further including a rough road traveling determination unit that
(a) determines a rough road traveling state based on a distribution state of the crankshaft rotation speed fluctuation physical quantity acquired by the crankshaft rotation speed fluctuation physical quantity acquisition unit, or (b) includes a vehicle traveling state detection unit for detecting a physical quantity in relation to a vehicle traveling state except the crankshaft rotation speed fluctuation physical quantity, and determines a rough road traveling state based on a detection result obtained by the vehicle traveling state detection unit, and
suspends a determination of a misfire in the internal combustion engine based on a determination result obtained by the rough road traveling determination unit, at least in the low load and low rotation speed region having a narrower interval between the adjacent tails as compared to the high load and high rotation speed region.

In the engine unit according to (1), the internal combustion engine is configured such that the high load and high rotation speed region in which an interval between adjacent tails of a distribution of a crankshaft rotation speed fluctuation amount under a normal state and a distribution of a crankshaft rotation speed fluctuation amount in a case of a misfire occurring is wide is present in a range of the crankshaft rotation speed and the load during traveling of the vehicle. Accordingly, the misfire detection device can distinguish whether the crankshaft rotation speed fluctuation physical quantity acquired by the crankshaft rotation speed fluctuation physical quantity acquisition unit in the high load and high rotation speed region is a crankshaft rotation speed fluctuation physical quantity under a normal state or a crankshaft rotation speed fluctuation physical quantity in a case of a misfire occurring, with an enhanced accuracy. As a result, a misfire detection accuracy in the high load and high rotation speed region can be enhanced.

At least in the low load and low rotation speed region, the rough road traveling determination unit having the configuration of (a) or (b) above determines a rough road traveling state, and the misfire detection device suspends a determination of a misfire in the internal combustion engine based on a determination result obtained by the rough road traveling determination unit. Thus, a misfire determination is performed when a rough road traveling is not performed. When a rough road traveling is not performed, a distribution of the crankshaft rotation speed fluctuation amount has its tail less extensive. This enables the misfire detection device to accurately distinguish whether the crankshaft rotation speed fluctuation physical quantity acquired by the crankshaft rotation speed fluctuation physical quantity acquisition unit is a crankshaft rotation speed fluctuation physical quantity under a normal state or a crankshaft rotation speed fluctuation physical quantity in a case of a misfire occurring. As a result, a misfire detection accuracy in the low load and low rotation speed region can be obtained. In a region other than the low load and low rotation speed region and than the high load and high rotation speed region, the suspension of a determination of a misfire in the internal combustion engine based on a determination result obtained by the rough road traveling determination unit having the configuration of (a) or (b) above may either be applied or not be applied. Whether or not to apply it can be set in accordance with characteristics of the internal combustion engine. This can maintain or enhance a misfire detection accuracy.

Accordingly, a misfire detection accuracy at a time of a high load and a high rotation speed can be enhanced while a misfire detection accuracy at a time of a low load and a low rotation speed is maintained.

The internal combustion engine is configured such that the interval between the adjacent tails of the distribution of the crankshaft rotation speed fluctuation physical quantity under a normal state and the distribution of the crankshaft rotation speed fluctuation physical quantity in a case of a misfire occurring tends to widen as the load increases and to narrow as the crankshaft rotation speed increases. This tendency can be identified based on, for example, a distribution of a crankshaft rotation speed fluctuation physical quantity obtained at a time of a flat road traveling or at a time of a bench test.

The internal combustion engine is configured such that the low load and low rotation speed region and the high load and high rotation speed region are present in a range of the crankshaft rotation speed and the load during traveling of the vehicle. Since the range of the crankshaft rotation speed and the load during traveling of the vehicle depends on specifications of the vehicle or the internal combustion engine, the rotation speed and the load for each region are not always limited to specific values or specific ranges. The low load and low rotation speed region and the high load and high rotation speed region can be determined in a relative sense. To be specific, in a case where the internal combustion engine is configured such that two regions that satisfy the following conditions (i) to (iii) are present in a range of the crankshaft rotation speed and the load during traveling of the vehicle, a first region of the two regions serves as the high load and high rotation speed region and a second region of the two regions serves as the low load and low rotation speed region.

(i) A load in the first region is higher than a load in the second region.

(ii) A rotation speed in the first region is higher than a rotation speed in the second region.

(iii) An interval in the first region between adjacent tails of a distribution of a crankshaft rotation speed fluctuation physical quantity under a normal state and a distribution of a crankshaft rotation speed fluctuation physical quantity in a case of a misfire occurring is wider than an interval in the second region between adjacent tails of a distribution of a crankshaft rotation speed fluctuation physical quantity under a normal state and a distribution of a crankshaft rotation speed fluctuation physical quantity in a case of a misfire occurring.

The adjacent tails may overlap each other. In a case of the adjacent tails overlapping each other, a larger overlap between the adjacent tails is interpreted as a narrower interval between the adjacent tails and a smaller overlap between the adjacent tails is interpreted as a wider interval between the adjacent tails. The interval between the adjacent tails in a case of the adjacent tails overlapping each other is narrower than the interval between the adjacent tails in a case of the adjacent tails being distant from each other.

(2) An engine unit according to another aspect of the present teaching is the engine unit according to (1), in which
the internal combustion engine is configured such that
in the high load and high rotation speed region, the adjacent tails are distant from each other, and
in the low load and low rotation speed region, the adjacent tails overlap each other, or the interval between the adjacent tails is narrower than the interval between the adjacent tails in the high load and high rotation speed region.

In the configuration of (2), the misfire detection device can distinguish whether the crankshaft rotation speed fluctuation physical quantity acquired by the crankshaft rotation speed fluctuation physical quantity acquisition unit when the load and the crankshaft rotation speed of the internal combustion engine are in the high load and high rotation speed region is a crankshaft rotation speed fluctuation physical quantity under a normal state or a crankshaft rotation speed fluctuation physical quantity in a case of a misfire occurring, with a further enhanced accuracy. As a result, a misfire detection accuracy in the high load and high rotation speed region can be further enhanced.

The internal combustion engine may be configured such that
in the low load and low rotation speed region, the adjacent tails overlap each other, and
in the high load and high rotation speed region, the overlap between the adjacent tails is smaller than the overlap between the adjacent tails in the low load and low rotation speed region, or the adjacent tails are distant from each other.

Since the interval between the adjacent tails in the high load and high rotation speed region is wider than the interval between the adjacent tails in the low load and low rotation speed region, the misfire detection device can distinguish whether the crankshaft rotation speed fluctuation physical quantity is a crankshaft rotation speed fluctuation physical quantity under a normal state or a crankshaft rotation speed fluctuation physical quantity in a case of a misfire occurring, with a further enhanced accuracy. As a result, a misfire detection accuracy in the high load and high rotation speed region can be further enhanced.

The internal combustion engine may be configured such that
in the high load and high rotation speed region, the adjacent tails are distant from each other, and
in the low load and low rotation speed region, the adjacent tails overlap each other.

The misfire detection device can distinguish whether the crankshaft rotation speed fluctuation physical quantity acquired by the crankshaft rotation speed fluctuation physical quantity acquisition unit at a time of the high load and high rotation speed region is a crankshaft rotation speed fluctuation physical quantity under a normal state or a crankshaft rotation speed fluctuation physical quantity in a case of a misfire occurring, with a further enhanced accuracy. As a result, a misfire detection accuracy in the high load and high rotation speed region can be further enhanced.

(3) The engine unit according to (1) or (2), in which the misfire determination unit sets a misfire determination region for determining the misfire state in the distribution of the crankshaft rotation speed fluctuation physical quantity, and determines the misfire state based on a distribution of a crankshaft rotation speed fluctuation physical quantity included in the misfire determination region, and the rough road traveling determination unit sets a rough road determination region for determining the rough road traveling state in the distribution of the crankshaft rotation speed fluctuation physical quantity such that the rough road determination region and the misfire determination region at least partially overlap each other, and determines the rough road traveling state based on a distribution of a crankshaft rotation speed fluctuation physical quantity included in the rough road determination region.

In the configuration of (3), the rough road determination region and the misfire determination region are set so as to at least partially overlap each other; the misfire state is determined based on a distribution state of the crankshaft rotation speed fluctuation physical quantity included in the misfire determination region; and the rough road traveling state is determined based on a distribution of the crankshaft rotation speed fluctuation physical quantity included in the rough road determination region. Thus, it is possible to set the rough road determination region and the misfire determination region in such a manner that a misfire detection accuracy can be obtained even when a distribution of a crankshaft rotation speed fluctuation physical quantity under a normal state and a distribution of a crankshaft rotation speed fluctuation physical quantity in a case of a misfire occurring are generated close to each other. In a case where a distribution of a crankshaft rotation speed fluctuation physical quantity under a normal state and a distribution of a crankshaft rotation speed fluctuation physical quantity in a case of a misfire occurring are generated at a distance from each other, it is possible to set the rough road determination region and the misfire determination region in such a manner that a misfire detection accuracy can be further enhanced.

The misfire determination region and the rough road determination region may partially or fully overlap each other. For example, the misfire determination region and the rough road determination region at least partially overlap each other such that both of the regions do not include a distribution peak of a crankshaft rotation speed fluctuation physical quantity under a normal state and do include a distribution peak of a crankshaft rotation speed fluctuation physical quantity in a case of a misfire occurring. The determination of the misfire state is performed based on, for example, a distribution magnitude of a crankshaft rotation speed fluctuation physical quantity included in the misfire determination region. The distribution magnitude of a crankshaft rotation speed fluctuation physical quantity corresponds to, for example, the number of times the crankshaft rotation speed fluctuation physical quantity appears (the number of data units). Counting the number of times the crankshaft rotation speed fluctuation physical quantity appears (the number of data units) in the misfire determination region makes it possible to determine the misfire state based on the distribution magnitude. An approach for determining the rough road traveling state is preferably different from an approach for determining the misfire state. This makes it possible to distinguish the rough road traveling state and the misfire state from each other with an enhanced accuracy under a situation where the rough road determination region and the misfire determination region are set so as to at least partially overlap each other. Regarding the approach for determining the rough road traveling state, an approach different from the approach for determining the misfire state may be an approach other than performing the determination based on the distribution magnitude (the number of times of appearance, the number of data units) of the crankshaft rotation speed fluctuation physical quantity included in the entire region. Examples of such an approach include an approach in the engine unit according to (4) below.

(4) An engine unit according to another aspect of the present teaching is the engine unit according to (3), in which the rough road traveling determination unit is configured to set the rough road determination region such that at least a part of the rough road determination region locates between two peaks of a distribution of a crankshaft rotation speed fluctuation physical quantity under a normal state and a distribution of a crankshaft rotation speed fluctuation physical quantity in a case of a misfire occurring, and determine the rough road traveling state based on a distribution of a crankshaft rotation speed fluctuation physical quantity included in the rough road determination region, by using such a difference in distribution states that, in a region between the two peaks, the distribution of the crankshaft rotation speed fluctuation physical quantity under a normal state is smaller and the distribution of the crankshaft rotation speed fluctuation physical quantity in a case of a misfire occurring is larger at a location more distant from the peak under a normal state.

A distribution of a crankshaft rotation speed fluctuation physical quantity under a normal state and a distribution of a crankshaft rotation speed fluctuation physical quantity in a case of a misfire occurring have two peaks. One of the peaks is a peak of the distribution of the crankshaft rotation speed fluctuation physical quantity under a normal state. The other of the peaks is a peak of the distribution of the crankshaft rotation speed fluctuation physical quantity in a case of a misfire occurring. The two peaks occur at an interval. Each of the distributions is centered at or substantially centered at its peak, and has such a tendency that the frequency of appearance of the crankshaft rotation speed fluctuation physical quantity decreases at a location more distant from the peak. Each of the distributions shows a normal distribution or a substantially normal distribution. In a region between the two peaks, therefore, the distribution (the frequency of appearance) of the crankshaft rotation speed fluctuation physical quantity under a normal state is smaller and the distribution (the frequency of appearance) of the crankshaft rotation speed fluctuation physical quantity in a case of a misfire occurring is larger at a location more distant from the peak under a normal state. In the configuration of (4), this difference between a distribution state under a normal state and a distribution state in a case of a misfire occurring is used to determine the rough road traveling state. This makes it possible to distinguish the rough road traveling state and the misfire state from each other with an enhanced accuracy under a situation where the rough road determination region and the misfire determination region are set so as to at least partially overlap each other. As a result, a misfire detection accuracy can be enhanced. One example of a specific approach is to determine the rough road traveling state by: dividing the rough road determination region into two regions such that a boundary between the two regions locates between the two peaks; and comparing distribution magnitudes of crankshaft rotation speed fluctuation physical quantities included in the respective regions with each other.

(5) A vehicle according to another aspect of the present teaching is a vehicle including the engine unit according to any one of (1) to (4).

The configuration of (5) can enhance a misfire detection accuracy at a time of a high load and a high rotation speed while maintaining a misfire detection accuracy at a time of a low load and a low rotation speed, based on a crankshaft rotation speed fluctuation.

The terminology used herein is for defining particular embodiments only and is not intended to be limiting the teaching.

As used herein, the term "and/or" includes any and all combinations of one or more of the associated listed items.

As used herein, the terms "including", "comprising", or "having", and variations thereof specify the presence of stated features, steps, operations, elements, components, and/or equivalents thereof, and can include one or more of steps, operations, elements, components, and/or their groups.

As used herein, the terms "attached", "connected", "coupled", and/or equivalents thereof are used in a broad sense, and include both of direct and indirect attachment, connection, and coupling. In addition, the terms "connected" and "coupled" can mean not only physical or mechanical connection or coupling but also direct or indirect electrical connection or coupling.

Unless otherwise defined, all terms (including technical and scientific terms) used herein have the same meaning as commonly understood by one of ordinary skill in the art to which the present teaching belongs.

It will be further understood that terms, such as those defined in commonly used dictionaries, should be interpreted as having a meaning that is consistent with their meaning in the context of the present disclosure and relevant art and should not be interpreted in an idealized or overly formal sense unless expressly so defined herein.

It will be understood that the description of the present teaching discloses a number of techniques and steps.

Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion.

Nevertheless, Description and Claims should be read with the understanding that such combinations are entirely within the scope of the present teaching and the claims.

In the description given below, for the purposes of explanation, numerous specific details are set forth in order to provide a thorough understanding of the present teaching.

It will be apparent, however, that those skilled in the art may practice the present teaching without these specific details.

The present disclosure is to be considered as an exemplification of the present teaching, and is not intended to limit the present teaching to the specific embodiments illustrated by drawings or descriptions below.

The engine unit includes the internal combustion engine and the misfire detection device, and is provided in a vehicle. The misfire detection device, for example, may be an ECU which will be described later, or may be a control device that is provided in the vehicle separately from an ECU. The misfire detection device is, for example, capable of communication at least with the internal combustion engine. The misfire detection device is, for example, configured to receive a signal outputted from a sensor or the like included in the internal combustion engine, and to transmit a control signal to various equipment, devices, or the like included in the internal combustion engine. The misfire detection device may be, for example, further configured to receive a signal outputted from a sensor or the like included in the vehicle, and to transmit a control signal to various equipment, devices, or the like included in the vehicle. The engine unit does not always mean that the internal combustion engine and the misfire detection device are physically unified. In the engine unit, the internal combustion engine and the misfire detection device may either be configured as a physically single unit or not be configured as a physically single unit.

The vehicle includes, for example, wheels in addition to the engine unit. The wheels include a drive wheel that is rotated by receiving power outputted from the internal combustion engine. The number of wheels is not particularly limited. No particular limitation is put on the vehicle, and examples thereof include a four-wheel automobile and a straddled vehicle. In an instance, the four-wheel automobile has a cabin. The straddled vehicle means a type of vehicle in which a driver strides a saddle when seated. Examples of the straddled vehicle include motorcycles, motor tricycles, and ATVs (All-Terrain Vehicles).

No particular limitation is put on the internal combustion engine. Examples thereof include a four-stroke engine. The internal combustion engine may be a gasoline engine or a diesel engine. The number of cylinders is not particularly limited. As the internal combustion engine, for example, internal combustion engines having various numbers of cylinders, such as four cylinders, six cylinders, and eight cylinders, may be mentioned. The internal combustion engine may be an internal combustion engine having a single cylinder, two cylinders, or three cylinders. A multi-cylinder internal combustion engine may be either of equal interval explosion type or of unequal interval explosion type.

A specific rotation speed corresponding to the high load and high rotation speed region is not particularly limited. The high load and high rotation speed region may be located in, for example, a region where the rotation speed is 6000 rpm or higher, a region where the rotation speed is 8000 rpm or higher, a region where the rotation speed is 9000 rpm or higher, or a region where the rotation speed is 10000 rpm or higher. In such a configuration, the low load and low rotation speed region is located in a region where the rotation speed is lower than the rotation speed in the high load and high rotation speed region.

Specific loads corresponding respectively to the high load and high rotation speed region and the low load and low rotation speed region are not particularly limited. They depend on specifications of the vehicle and/or the internal combustion engine, and also on how to detect the loads. A specific numerical value of the load is not particularly limited. The high load corresponds to, for example, a load occurring when the vehicle accelerates, climbs up a hill, or travels at a high speed so as to maintain a high-speed rotation of the internal combustion engine. The low load corresponds to, for example, a load occurring when the vehicle normally travels, decelerates, or climbs down a hill. The high load and the low load can be specified in a relative sense. The internal combustion engine may include, for example, a load detector for detecting a load of the internal combustion engine. No particular limitation is put on the load detector, and a conventionally known detector such as an intake pipe pressure sensor or an in-cylinder pressure sensor is adoptable. The misfire detection device may include, for example, a load-related information acquisition unit that acquires information related to a load of the internal combustion engine based on a signal from the load detector. The misfire detection device may perform the suspension of a determination of a misfire in the internal combustion engine based on a determination result obtained by the rough road traveling determination unit, without using a signal from the load detector or information obtained by the load-related information acquisition unit.

No particular limitation is put on the crank angle signal output unit, and a conventionally known device is adoptable. Examples of the crank angle signal output unit include a resolver, a Hall IC, an electromagnetic induction type sensor, and the like.

A hardware configuration of the misfire detection device is not particularly limited. The misfire detection device may be constituted of a computer including a central processing unit and a storage device. The misfire detection device may be partially or entirely configured as a wired logic which is an electronic circuit. The misfire detection device may be entirely configured as a physically single unit, or may be configured as a combination of a plurality of physically separate devices.

The crankshaft rotation speed fluctuation physical quantity is a physical quantity in relation to the amount of fluctuation in the rotation speed of the crankshaft. The crankshaft rotation speed fluctuation physical quantity is a value that reflects a crankshaft rotation speed variation, and the value under a normal state and the value in a case of a misfire occurring are different from each other. The crankshaft rotation speed fluctuation physical quantity varies in accordance with a crankshaft rotation speed fluctuation so as to show a fluctuation amount having a correlation with the amount of fluctuation in the rotation speed of the crankshaft. A crankshaft rotation speed in a case of a misfire occurring is lower than a crankshaft rotation speed under a normal state, and therefore when the crankshaft rotation speed fluctuation physical quantity has a positive correlation with the amount of fluctuation in the rotation speed of the crankshaft, the crankshaft rotation speed fluctuation physical quantity in a case of a misfire occurring is smaller than the crankshaft rotation speed fluctuation physical quantity under a normal state. When the crankshaft rotation speed fluctuation physical quantity has a negative correlation with the amount of fluctuation in the rotation speed of the crankshaft, the crankshaft rotation speed fluctuation physical quantity in a case of a misfire occurring is greater than the crankshaft rotation speed fluctuation physical quantity under a normal state. The correlation mentioned above may be either positive or negative. The crankshaft rotation speed fluctuation physical quantity may be the crankshaft rotation speed itself, or may be a value acquired from the crankshaft rotation speed or based on the crankshaft rotation speed. The crankshaft rotation speed may be an instantaneous rotation speed acquired based on a single time interval of crank signals that are periodically and sequentially outputted from the crank angle signal output unit, or may be an average rotation speed (moving average rotation speed) in a section of predetermined crank angles (for example, 180 CAD, 360 CAD). The crankshaft rotation speed fluctuation physical quantity may be, for example, a difference value between a rotation speed (an instantaneous rotation speed or an average rotation speed) corresponding to a first crank angle section and a rotation speed (an instantaneous rotation speed or an average rotation speed) corresponding to a second crank angle section. In such a configuration, the first crank angle section is, for example, set so as to at least partially overlap a section ranging from a compression top dead center of a misfire detection object cylinder to a compression top dead center that comes next in the internal combustion engine. The second crank angle section is, for example, set at a position before this compression top dead center. In a case of a misfire occurring at the compression top dead center, the crankshaft rotation speed corresponding to the first crank angle section decreases whereas the crankshaft rotation speed corresponding to the second crank angle section is not influenced by the misfire. Thus, by acquiring the difference value, a crankshaft rotation speed fluctuation physical quantity that reflects a difference between under a normal state and in a case of a misfire occurring is obtained. A rotation speed corresponding to each section may not necessarily be used as it is to acquire the difference value. It may be acceptable that computation or correction processing is performed on each of rotation speeds corresponding to the respective sections, and a difference value is acquired based on the rotation speeds obtained after the processing. The crankshaft rotation speed fluctuation physical quantity may be a crankshaft rotation speed fluctuation physical quantity for an equal interval explosion engine, or may be a crankshaft rotation speed fluctuation physical quantity for an unequal interval explosion engine. The crankshaft rotation speed fluctuation physical quantity may be, for example, a rotation speed of a rotator (for example, a gear, a shaft, or the like) in a power transmission path extending from the crankshaft to the wheel.

Advantageous Effects of Invention

The present teaching can provide: an engine unit including a misfire detection device and an internal combustion engine capable of enhancing a misfire detection accuracy at a time of a high load and a high rotation speed while maintaining a misfire detection accuracy at a time of a low load and a low rotation speed, based on a crankshaft rotation speed fluctuation; and a vehicle.

DESCRIPTION OF EMBODIMENTS

The following describes an embodiment of the present teaching with reference to the drawings. It should be noted that the present teaching is not limited to the following embodiment.

Figure 1A:
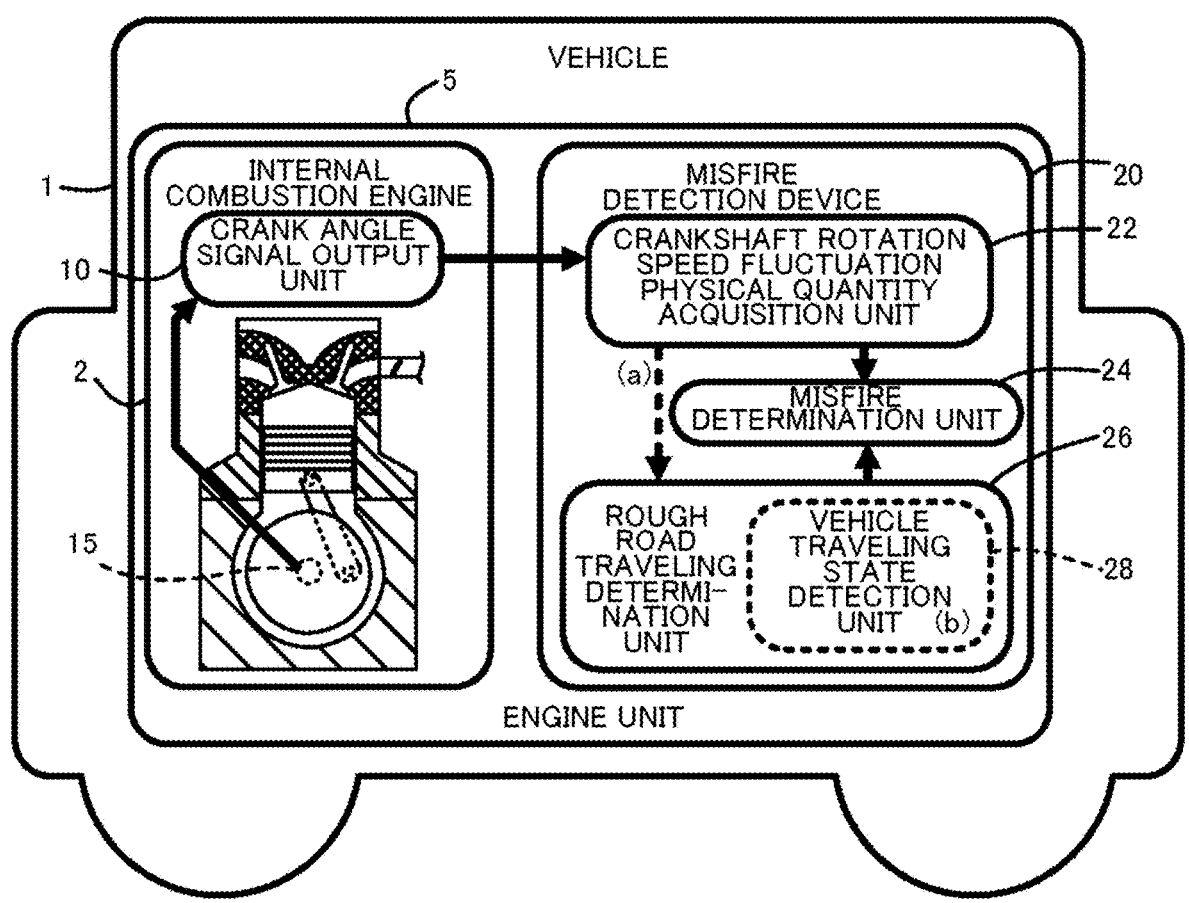
FIG. 1A is an explanatory diagram schematically showing an engine unit according to an embodiment, and an internal configuration of a vehicle equipped with the engine unit.
Figure 1B:
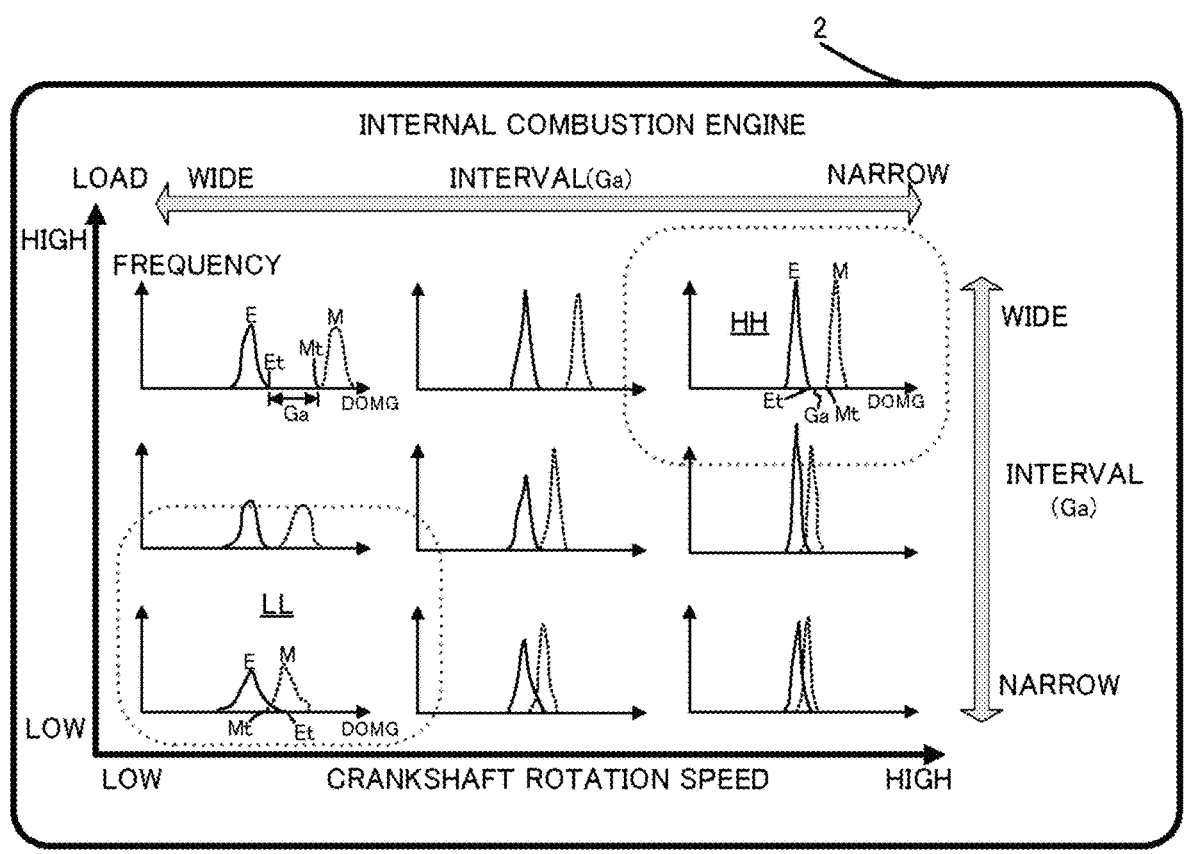
FIG. 1B is an explanatory diagram showing distributions of a crankshaft rotation speed fluctuation amount in an internal combustion engine included in the engine unit shown in FIG. 1A.

FIG. 1A is an explanatory diagram schematically showing an engine unit according to an embodiment, and an internal configuration of a vehicle equipped with the engine unit. FIG. 1B is an explanatory diagram showing distributions of a crankshaft rotation speed fluctuation amount in an internal combustion engine included in the engine unit shown in FIG. 1A.

As shown in FIG. 1A, a vehicle 1 is a four-wheel automobile. As mentioned above, the vehicle is not limited to a four-wheel automobile, and may be a motorcycle, for example. The vehicle 1 is equipped with an engine unit 5. The engine unit 5 includes an internal combustion engine 2 and an ECU 20 (misfire detection device).

The internal combustion engine 2 is an equal interval explosion four-cylinder engine. As mentioned above, the internal combustion engine is not limited to an equal interval explosion engine, and may be an unequal interval explosion engine. The number of cylinders is not particularly limited. In the figure, only one of cylinders is shown.

The internal combustion engine 2 includes a crankshaft 15 and a crank angle signal output unit 10. The crank angle signal output unit 10 is configured to detect a rotator (not shown), which rotates together with the crankshaft 15, for every predetermined crank angle degrees in accordance with rotation of the crankshaft 15, and to output a signal to the ECU 20. In the embodiment, the predetermined crank angle degrees are 30 CAD (Crank Angle Degrees). The predetermined crank angle degrees are not particularly limited, and may be 15 CAD, for example.

The internal combustion engine 2 is configured such that a moment of inertia of the crankshaft 15 is low. In a high load and high rotation speed region HH (see the upper right graph in FIG. 1B), therefore, a distribution E of a crankshaft rotation speed fluctuation physical quantity DOMG (hereinafter also referred to as a fluctuation physical quantity DOMG) under a normal state (in a case of no misfire) on a flat road and a distribution M of a fluctuation physical quantity DOMG in a case of a misfire occurring on a flat road have their adjacent tails Et and Mt distant from each other. There is an interval Ga between the tail Et of the distribution E and the tail Mt of the distribution M. As a result, the internal combustion engine 2 has, as characteristics of the engine itself, an enhanced misfire detectability in the high load and high rotation speed region. In the internal combustion engine 2, the interval Ga is wide over an entire high load region including the high load and high rotation speed region HH. Here, the fluctuation physical quantity DOMG is a physical quantity in relation to the amount of fluctuation in the rotation speed of the crankshaft 15. The fluctuation physical quantity DOMG is a value that reflects a crankshaft rotation speed variation, and the value under a normal state and the value in a case of a misfire occurring are different from each other. The fluctuation physical quantity DOMG is defined by Math 1 as described below in the embodiment. The fluctuation physical quantity DOMG is one example of a crankshaft rotation speed fluctuation physical quantity. The fluctuation physical quantity DOMG will be described later.

As described above, the internal combustion engine 2 is configured such that the moment of inertia of the crankshaft 15 is low, for the purpose of obtaining a misfire detectability in the high load and high rotation speed region HH. Reduction in the moment of inertia of the crankshaft 15 causes the distribution E and the distribution M to overlap each other in a low load and low rotation speed region LL (see the lower left graph in FIG. 1B). There is no interval Ga between the tail Et of the distribution E and the tail Mt of the distribution M. As a result, the misfire detectability decreases in the low load and low rotation speed region LL. In the low load and low rotation speed region LL, distinction between a rough road traveling state and a misfire is difficult.

As shown in FIG. 1B, the internal combustion engine 2 is configured such that the low load and low rotation speed region LL in which the interval Ga between the adjacent tails Et and Mt is relatively narrow and the high load and high rotation speed region HH in which the interval Ga between the adjacent tails Et and Mt is relatively wide are present in a range of a crankshaft rotation speed (horizontal axis in the figure) and a load (vertical axis in the figure) during traveling of the vehicle 1. The interval Ga between the adjacent tails Et and Mt tends to widen as the load increases and to narrow as the crankshaft rotation speed increases. How to reduce the moment of inertia of the crankshaft 15 is not particularly limited, and a conventionally known method of, for example, adjusting a weight that is provided or applied to the crankshaft 15 is adoptable.

As shown in FIG. 1A, the ECU 20 includes a crankshaft rotation speed fluctuation physical quantity acquisition unit 22, a misfire determination unit 24, and a rough road traveling determination unit 26.

The crankshaft rotation speed fluctuation physical quantity acquisition unit 22 receives a signal outputted from the crank angle signal output unit 10 each time the crankshaft 15 is rotated through the predetermined crank angle degrees, and acquires a fluctuation physical quantity DOMG based on the signal.

The rough road traveling determination unit 26 determines whether or not the vehicle 1 is in a rough road traveling state. The rough road traveling determination unit 26 can adopt a configuration of either (a) or (b) below.

(a) The rough road traveling determination unit 26 may be configured to determine the rough road traveling state based on a distribution state of the fluctuation physical quantity DOMG acquired by the crankshaft rotation speed fluctuation physical quantity acquisition unit 22.

(b) The rough road traveling determination unit 26 may be configured to include a vehicle traveling state detection unit 28 that detects the physical quantity in relation to a traveling state of the vehicle 1 except a crankshaft rotation speed fluctuation physical quantity (such as the fluctuation physical quantity DOMG), and to determine the rough road traveling state based on a detection result obtained by the vehicle traveling state detection unit 28.

The following description of this embodiment deals with a case where the rough road traveling determination unit 26 adopts the configuration of (a) above.

The misfire determination unit 24 is configured to determine a misfire state of the internal combustion engine 2 based on the fluctuation physical quantity DOMG acquired by the crankshaft rotation speed fluctuation physical quantity acquisition unit 22. The misfire determination unit 24 is further configured to, at least in the low load and low rotation speed region LL, suspend a determination of a misfire in the internal combustion engine 2 based on a determination result obtained by the rough road traveling determination unit 26. To be specific, in this embodiment, the misfire determination unit 24 does not suspend a misfire determination based on a determination result obtained by the rough road traveling determination unit 26 in a high load region, and suspends a determination of a misfire in the internal combustion engine 2 based on a determination result obtained by the rough road traveling determination unit 26 in a region other than the high load region. Here, the misfire determination unit 24 may be configured to suspend a determination of a misfire in the internal combustion engine 2 based on a determination result obtained by the rough road traveling determination unit 26 over an entire region.

Figure 2:
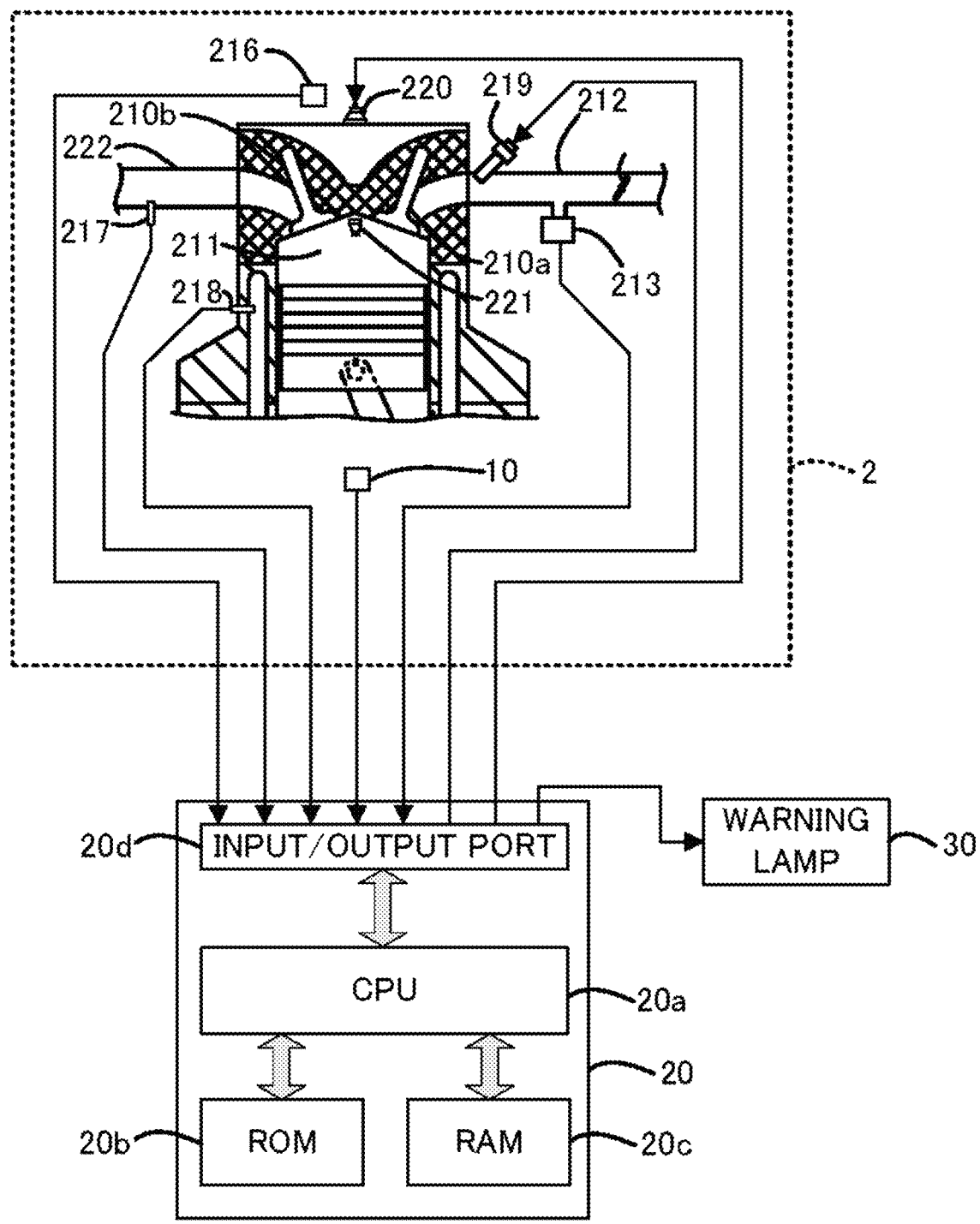
FIG. 2 A block diagram schematically showing an electrical configuration of the internal combustion engine included in the engine unit shown in FIG. 1A.

FIG. 2 is a block diagram schematically showing an electrical configuration of the internal combustion engine included in the engine unit shown in FIG. 1A.

The internal combustion engine 2 includes, in addition to the above-described configurations, an intake pipe 212, an intake pipe pressure sensor 213, a reference position sensor 216, an exhaust gas sensor 217, and a water temperature sensor 218.

The intake pipe 212 leads air introduced by an air cleaner (not shown) into a combustion chamber 211. The intake pipe pressure sensor 213 is configured to detect a pressure in the intake pipe 212, and to output a signal to the ECU 20. The reference position sensor 216 is configured to output a signal to the ECU 20 for each reference position (for example, the compression top dead center) of one cylinder that is defined as a reference, in accordance with rotation of a camshaft (not shown). An intake valve 210a and an exhaust valve 210b are opened and closed along with rotation of the camshaft. The exhaust gas sensor 217 detects an ingredient of an exhaust gas passing through an exhaust pipe 222. The water temperature sensor 218 is configured to detect a temperature of a coolant, and to output a signal to the ECU 20.

The ECU 20 is configured to control an injector 219, an ignition coil 220, a spark plug 221, and the like, based on signals outputted from sensors such as the intake pipe pressure sensor 213, the crank angle signal output unit 10, the reference position sensor 216, the exhaust gas sensor 217, and the water temperature sensor 218.

The ECU 20 includes a CPU 20a, a ROM 20b, a RAM 20c, and an input/output port 20d. The ROM 20b stores a control program and data necessary for computation. The RAM 20c temporarily stores data during an operation of the CPU 20a. The CPU 20a reads out the control program and data from the ROM 20b as appropriate, and executes a computing process, a control process. The input/output port 20d inputs and outputs signals. Additionally, a warning lamp 30 is connected to the ECU 20. The CPU 20a executes the control program, to function as the crankshaft rotation speed fluctuation physical quantity acquisition unit 22, the misfire determination unit 24, the rough road traveling determination unit 26, and the vehicle traveling state detection unit 28 shown in FIG. 1A.

Figure 3:
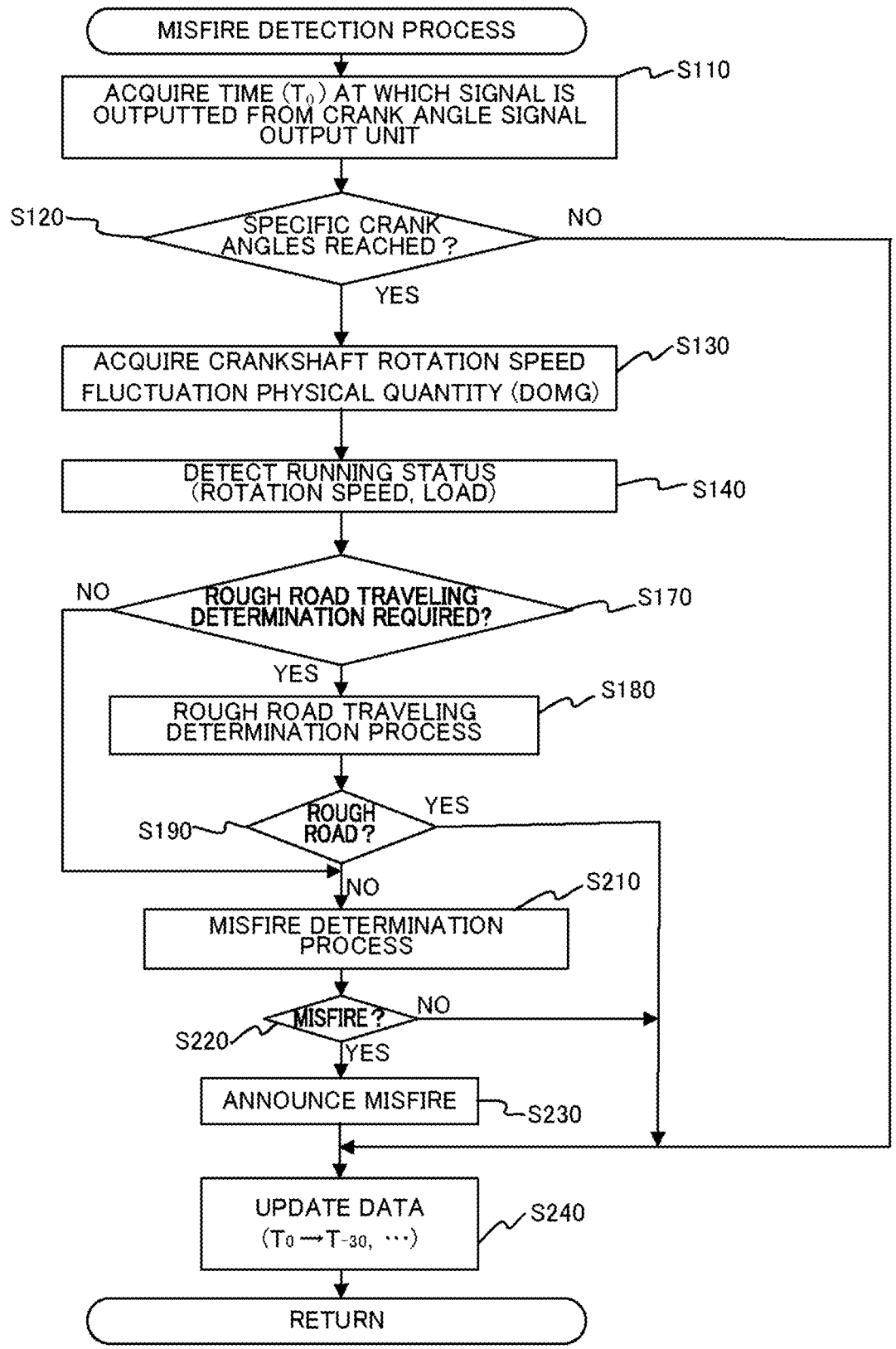
FIG. 3 A flowchart of a misfire detection process executed by a misfire detection device included in the engine unit shown in FIG. 1(a).

FIG. 3 is a flowchart of a misfire detection process executed by the ECU 20 (misfire detection device) included in the engine unit shown in FIG. 1A. The misfire detection process is executed as an interruption process each time the crank angle signal output unit 10 outputs a signal at predetermined crank angle degrees in the internal combustion engine 2.

First, in step S110, the CPU 20a acquires a time $T_0$ at which a signal is outputted from the crank angle signal output unit 10. $T_0$ represents a current interruption time. The CPU 20a stores the acquired time $T_0$ in the RAM 20c.

Then, in step S120, the CPU 20a determines whether or not the crankshaft 15 has reached a specific crank angle. The specific crank angle is set as a timing for acquiring a crankshaft rotation speed fluctuation physical quantity in step S130 which will be described later. In one cycle (720 CAD), a single specific crank angle may be set, or a plurality of different specific crank angles may be set. In a case of the internal combustion engine 2 having a plurality of cylinders, a specific crank angle common to all the cylinders may be set, or specific crank angles for the respective cylinders may be set. For example, the specific crank angle may be a crank angle corresponding to the compression top dead center of each cylinder, or may be a value obtained by adding a predetermined crank angle to a crank angle corresponding to the compression top dead center of each cylinder. The specific crank angles may be set for the respective cylinders at intervals corresponding to a crank angle of 720 CAD (one-cycle crank angle)/the number of cylinders. The processing in step S120 may be executed based on a signal outputted from the crank angle signal output unit 10, may be executed based on a signal outputted from the reference position sensor 216, or may be executed based on signals outputted from the crank angle signal output unit 10 and the reference position sensor 216.

If the determination in step S120 is that the crankshaft 15 has not reached the specific crank angle, the CPU 20a shifts the processing to step S240. If the determination is that the crankshaft 15 has reached the specific crank angle, the CPU 20a shifts the processing to step S130.

Then, in step S240, the CPU 20a updates each of time data units stored in the RAM 20c. As a result, $T_0$ is changed to $T_{-30}$ in the RAM 20c. $T_{-30}$, $T_{-60}$, $T_{-90}$, . . . are also changed to $T_{-60}$, $T_{-90}$, $T_{-120}$, . . . . Here, the subscript represents crank angle degrees through which the crankshaft 15 has been rotated from a time point when the data unit was acquired. After the process of this flowchart ends, this flowchart is started to execute step S110, so that time data units of $T_0$, $T_{-30}$, $T_{-60}$, $T_{-90}$, . . . are stored in the RAM 20c. After the processing in step S240, the CPU 20a ends this subroutine.

In step S130, the CPU 20a acquires a fluctuation physical quantity DOMG based on time data units of $T_0$, $T_{-30}$, $T_{-60}$, $T_{-90}$, . . . stored in the RAM 20c. In step S130, the CPU 20a functions as the crankshaft rotation speed fluctuation physical quantity acquisition unit 22 that acquires a physical quantity in relation to the amount of fluctuation in the rotation speed of the crankshaft 15 based on a signal from the crank angle signal output unit 10.

The fluctuation physical quantity DOMG is obtained for each cylinder based on, for example, the following expression:

$$DOMG\ \#C = OMG\ \#C' - OMG\ \#C$$

$$OMG\ \#C = 1/(T_0 - T_{-180})$$

$$OMG\ \#C' = 1/(T_{-360} - T_{-540}) \qquad \text{[Math 1]}$$

where # means cylinder numbering.

Figure 4:
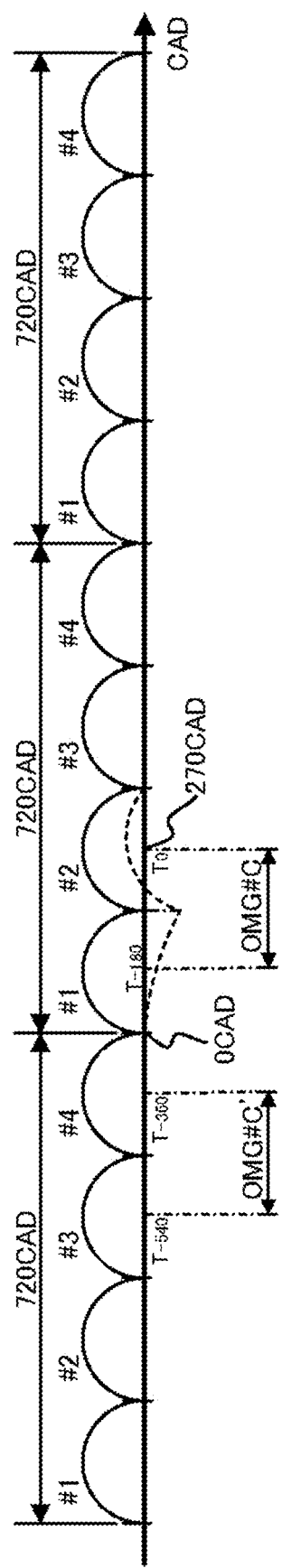
FIG. 4 An explanatory diagram concerning a crankshaft rotation speed fluctuation physical quantity according to the embodiment.

Referring to FIG. 4, a fluctuation physical quantity DOMG according to the embodiment will be described.

FIG. 4 is an explanatory diagram concerning acquisition of a fluctuation physical quantity DOMG. In FIG. 4, a fluctuation physical quantity DOMG1C for a first cylinder is shown as an example. Cylinder numbering in this embodiment is according to the order of cylinders starting from the one whose piston reaches the compression top dead center earliest. The compression top dead center of the first cylinder is 0 CAD. The compression top dead centers of the second to fourth cylinders are 180 CAD, 360 CAD, and 540 CAD, respectively, though not shown. The horizontal axis represents the crank angle. The vertical axis schematically shows a fluctuation in the rotation speed of the crankshaft 15. The solid line indicates a fluctuation in the rotation speed of the crankshaft 15 under a normal state. The broken line indicates a fluctuation in the rotation speed of the crankshaft 15 in a case of a misfire occurring in a corresponding cylinder (in the figure, the first cylinder).

In an example shown in FIG. 4, the crankshaft 15 is positioned at 270 CAD ($T_0$). As for the fluctuation physical quantity DOMG1C, the specific crank angle in step S120 is 270 CAD. In this embodiment, the specific crank angle is a value obtained by adding a predetermined crank angle (270 CAD) to a crank angle (0 CAD) corresponding to the compression top dead center. If the crank angle is 270 CAD, the CPU 20a executes step S130, to acquire the fluctuation physical quantity DOMG1C based on the expression above. As for fluctuation physical quantities DOMG2C, DOMG3C, and DOMG4C for the second to fourth cylinders as well, the specific crank angles are individually set, and the fluctuation physical quantities DOMG2C, DOMG3C, and DOMG4C are acquired in the same manner as the fluctuation physical quantity DOMG1C described above.

As shown in FIG. 4, the rotation speed (broken line) of the crankshaft 15 in a case of a misfire occurring in a corresponding cylinder is lower than the rotation speed (solid line) of the crankshaft 15 in a case of the same cylinder being in a normal state. A crank angle range (90 to 270 CAD) corresponding to OMG#C is set so as to overlap a section ranging from a compression top dead center (0 CAD) of a cylinder corresponding to OMG#C to a compression top dead center (180 CAD) that comes next in the internal combustion engine 2. The crank angle range (90 to 270 CAD) corresponding to OMG#C at least partially overlaps an expansion stroke (0 to 180 CAD). In this embodiment, OMG#C obtained in a case of a misfire occurring is lower than OMG#C obtained under a normal state. A crank angle range corresponding to OMG#C' is set at a position before this compression top dead center (0 CAD) such that it is not influenced by a misfire occurring at the compression top dead center. Thus, by acquiring a difference between OMG#C and OMG#C', a fluctuation physical quantity DOMG that reflects a difference between a crankshaft rotation speed under a normal state and a crankshaft rotation speed in a case of a misfire occurring is obtained. As a result, the fluctuation physical quantity DOMG obtained in a case of a misfire occurring has a value different from a value of the fluctuation physical quantity DOMG obtained under a normal state. In this embodiment, a fluctuation physical quantity DOMG acquired in step S130 is stored in the RAM 20c in association with a corresponding cylinder.

Then, in step S140, the CPU 20a detects a running status at the current time point based on signals outputted from sensors. The running status includes at least a rotation speed of the crankshaft 15 and an intake pipe pressure. In this embodiment, a load on the internal combustion engine 2 is detected based on the intake pipe pressure.

Then, in step S170, the CPU 20a determines whether or not to perform a rough road traveling determination which will be described later, based on the running status detected in step S140. In this embodiment, as shown in FIG. 1(b), the internal combustion engine 2 is configured such that the interval Ga between the adjacent tails Et and Mt is wide in the high load region, and therefore no rough road traveling determination is performed in the high load region. The rough road traveling determination is performed in a region other than the high load region. In a case of performing the rough road traveling determination, the CPU 20a shifts the processing to step S180. In a case of not performing the rough road traveling determination, the CPU 20a shifts the processing to step S210.

In step S180, the CPU 20a executes a rough road traveling determination process. At this time, the CPU 20a functions as the rough road traveling determination unit 26. In this embodiment, the CPU 20a determines a rough road traveling state based on a distribution state of the crankshaft rotation speed fluctuation physical quantity obtained by the crankshaft rotation speed fluctuation physical quantity acquisition unit 22. The rough road traveling determination process will be described later. After step S180, the CPU 20a shifts the processing to step S190.

In step S190, the CPU 20a determines whether or not the vehicle 1 is in a rough road traveling state based on a result of the rough road traveling determination process. If the determination is that the vehicle 1 is in a rough road traveling state, the CPU 20a shifts the processing to step S240. The processing in step S240 is as described above. After step S240, this subroutine ends. That is, if it is determined that the vehicle 1 is in a rough road traveling state, a later-described process (misfire determination process) in step S210 is not executed. If it is determined that the vehicle 1 is not in a rough road traveling state, the CPU 20a shifts the processing to step S210.

In this embodiment, a rough road traveling state announcement is not performed when it is determined that the vehicle 1 is in a rough road traveling state. It however may be acceptable that the rough road traveling state announcement is performed. In a case of performing the rough road traveling state announcement, how to announce the rough road traveling state is not particularly limited. For example, the CPU 20a may light up the warning lamp 30 in a predetermined pattern indicating that the vehicle 1 is in a rough road traveling state. A manner of the announcement is not limited to this example. Examples of a visual announcement include an announcement using letters, symbols, and the like, on a display device. The announcement may be performed in an auditory way using a voice or the like, or may be performed in a haptic way using a vibration or the like.

In step S210, the CPU 20a determines a misfire state of the internal combustion engine 2 based on the crankshaft rotation speed fluctuation physical quantity acquired by the crankshaft rotation speed fluctuation physical quantity acquisition unit 22. At this time, the CPU 20a functions as the misfire determination unit 24. The misfire determination process will be described later. After step S210, the CPU 20a shifts the processing to step S220.

If the determination in step S220 based on a result of the misfire determination process is that a misfire is occurring, the CPU 20a shifts the processing to step S230. If the determination is that no misfire is occurring, the CPU 20a shifts the processing to step S240. After the step S240, this subroutine ends.

In step S230, the CPU 20a executes processing for announcing the misfire. How to announce the misfire is not particularly limited. In this embodiment, the CPU 20a lights up the warning lamp 30 in a predetermined pattern indicating a misfire. As a manner of the announcement, various announcement ways are adoptable similarly to the rough road traveling state announcement illustrated above. Then, the CPU 20a shifts the processing to step S240. After step S240, this subroutine ends.

Next, the rough road traveling determination process and the misfire determination process will be described with reference to FIGS. 5A to 5C.

In the rough road traveling determination process and the misfire determination process, a plurality of fluctuation physical quantities DOMG that are acquired through repeated execution of step S130 of the misfire detection process (FIG. 3) and that are stored in the RAM 20c are used.

Figure 5A:
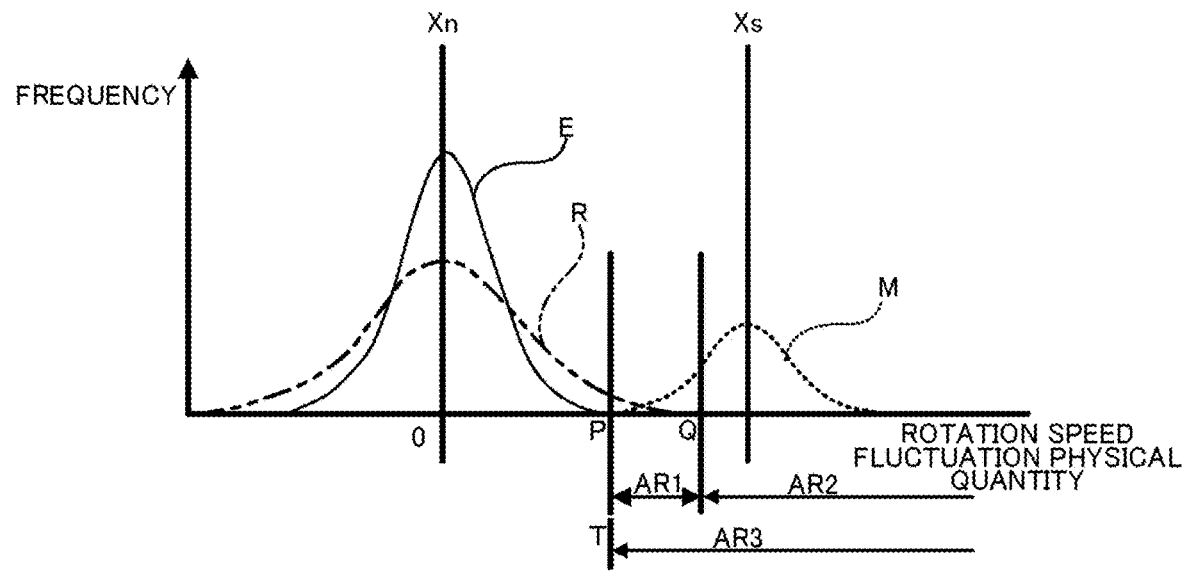
FIGS. 5A, 5B, and 5C are explanatory diagrams concerning a rough road traveling determination process and a misfire determination process.

FIG. 5A is a diagram for explanation of a distribution of the fluctuation amount. A distribution E of the amount of fluctuation under a normal state (in a case of no misfire) on a flat road and a distribution R of the amount of fluctuation under a normal state on a rough road are normal distributions or substantially normal distributions. The distributions E and R have a peak Xn which is common or substantially common to them. The horizontal axis represents the rotation speed fluctuation physical quantity with the peak Xn serving as a reference (0). The vertical axis represents the frequency of appearance (the number of data units) of the rotation speed fluctuation physical quantity. The fluctuation amount on a rough road shows a larger dispersion than that of the fluctuation amount on a flat road. The distribution R has a wider tail and a lower peak than those of the distribution E. A distribution M of the amount of fluctuation in a case of a misfire occurring on a flat road, which is a normal distribution or a substantially normal distribution, has a peak Xs. In an example shown in FIG. 5A, the distribution M has a narrower tail and a lower peak than those of the distribution E. The distributions E, R under a normal state and the distribution M in a case of a misfire occurring show different tendencies in terms of their peaks Xn, Xs, as follows. As shown in FIG. 5A, each of the distributions E, R under a normal state has a chevron shape centered at or substantially centered at the peak Xn. The distribution M in a case of a misfire occurring has a chevron shape centered at or substantially centered at the peak Xs. The two peaks Xn, Xs occur at an interval. In the distribution of the fluctuation physical quantity DOMG (see FIG. 5A), there is such a tendency that, in a region between the two peaks Xn, Xs, the distributions E, R under a normal state has a smaller height and the distribution M in a case of a misfire occurring has a larger height at a location more distant from the peak Xn. In this embodiment, this difference in the tendency is used to perform the rough road determination process which will be described later.

A rough road determination region (AR1 and AR2) includes a first region AR1 and a second region AR2, and is used for the rough road traveling determination process (step S180 in FIG. 3). A misfire determination region AR3 is used for the misfire determination process (step S210 in FIG. 3). The rough road determination region (AR1 and AR2) and the misfire determination region AR3 are set so as to at least partially overlap each other.

A lower limit value P of the rough road determination region (AR1 and AR2) is set between the two peaks Xn, Xs. A lower limit value T of the misfire determination region AR3 is set between the two peaks Xn, Xs. The lower limit values P, T are set such that the distribution E and the distribution M are distinguishable. The lower limit values P, T are set at such positions that they do not or substantially not overlap the distributions E, M. The lower limit values P, T are set such that their overlap with the distributions E, M is as small as possible. In this embodiment, the lower limit values P, T are the same value. The first region AR1 and the second region AR2 are set so as to be continuous. A boundary value Q between the first region AR1 and the second region AR2 is set such that a distance (difference) between the boundary value Q and the peak Xs is shorter than a distance between the lower limit value P and the peak Xs. The rough road determination region (AR1 and AR2) and the misfire determination region (AR3) have no upper limit value.

Figure 5B:
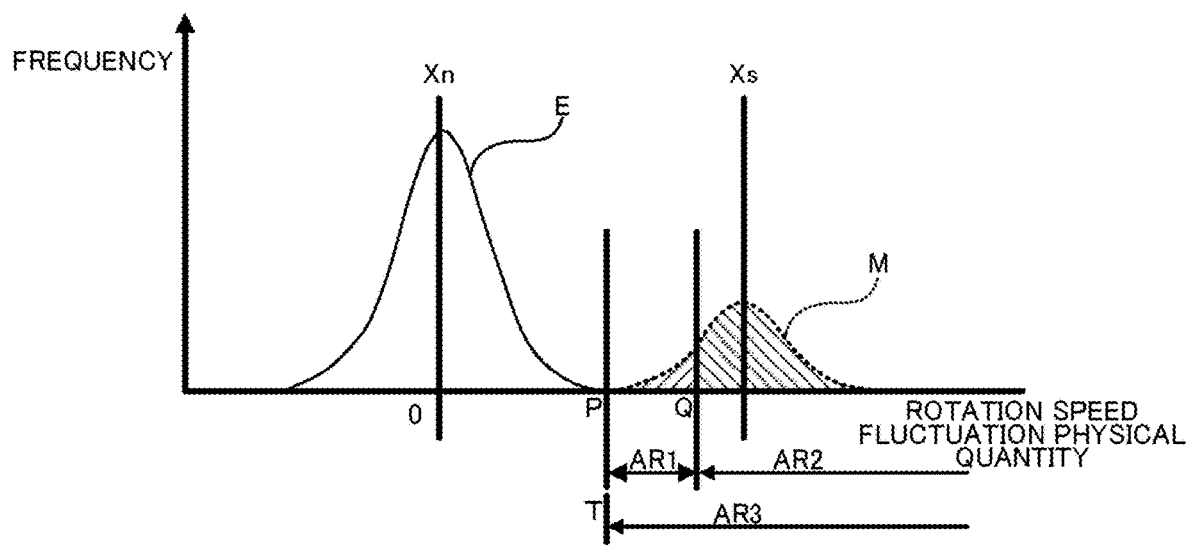

FIG. 5B shows an exemplary distribution of the fluctuation amount on a flat road. In the rough road traveling determination process (step S180 in FIG. 3), a distribution magnitude in the first region AR1 is compared against a distribution magnitude in the second region AR2. More specifically, the CPU 20a counts the number of data units included in the first region AR1 and the number of data units included in the second region AR2, and compares a counter value of the first region AR1 against a counter value of the second region AR2. If the distribution in the first region AR1 is larger than the distribution in the second region AR2 (if the counter value of the first region AR1 is greater than the counter value of the second region AR2), the CPU 20a determines that the vehicle 1 is in a rough road traveling state. If the distribution in the region AR2 is larger than the distribution in the region AR1, the CPU 20a determines that the vehicle 1 is not in a rough road traveling state. In an example shown in FIG. 5B, it is determined that the vehicle 1 is not in a rough road traveling state.

In the misfire determination process (step S210 in FIG. 3), the presence or absence of a misfire is determined based on a distribution magnitude in the misfire determination region AR3. To be specific, the CPU 20a counts the number of data units included in the misfire determination region AR3, and determines the presence or absence of a misfire based on a counter value of the misfire determination region AR3. An approach for the misfire determination is not particularly limited. For example, it is determined that a misfire is occurring if the counter value of the misfire determination region AR3 or the ratio of the counter value to the total number of data units is equal to or greater than a predetermined value. In the example shown in FIG. 5B, it is determined that a misfire is occurring. The crankshaft rotation speed fluctuation physical quantity used in the misfire determination process may not necessarily be the same as the crankshaft rotation speed fluctuation physical quantity used in the rough road determination process. For example, in a case where the fluctuation physical quantity DOMG is used in the rough road determination process, a value obtained by subjecting the fluctuation physical quantity DOMG to a computing process (for example, an exponential moving average process) may be used as the crankshaft rotation speed fluctuation physical quantity in the misfire determination process.

Figure 5C:
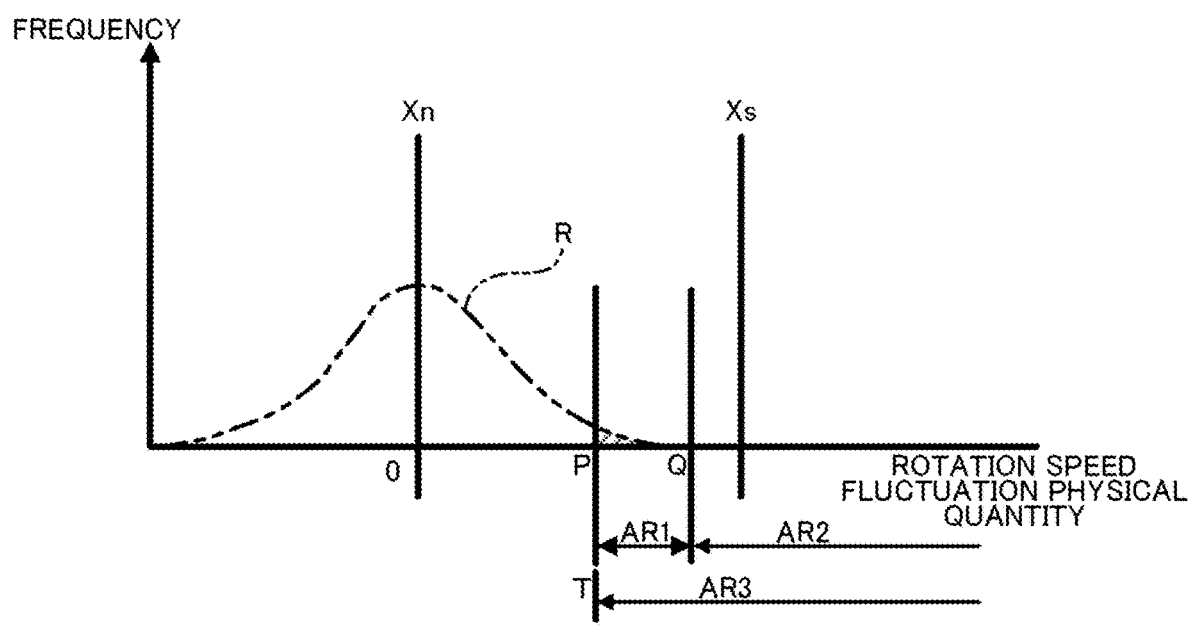

FIG. 5C shows an exemplary distribution of the fluctuation amount on a rough road. In the example shown in FIG. 5C, the rough-road distribution R is partially included in the rough road determination region AR1. The distribution R is not included in the rough road determination region AR2. A distribution in the rough road determination region AR1 is, therefore, larger than a distribution in the region AR2. As a result, it is determined that the vehicle 1 is in a rough road traveling state in the rough road traveling determination process (step S180 in FIG. 3). In this embodiment, upon determination that the vehicle 1 is in a rough road traveling state, the misfire determination process is not executed. Here, the misfire detection device may be configured to execute the misfire determination process upon determination that the vehicle is in a rough road traveling state, and to determine that no misfire is occurring in this misfire determination process.

Figure 6A:
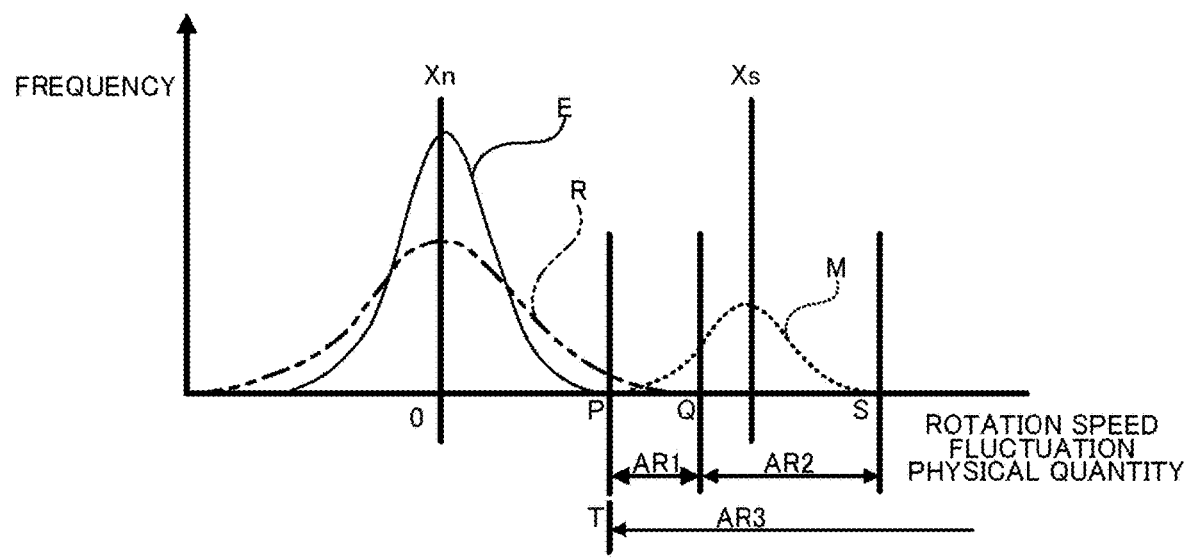
FIGS. 6A and 6B are explanatory diagrams concerning a rough road traveling determination process and a misfire determination process.
Figure 6B:
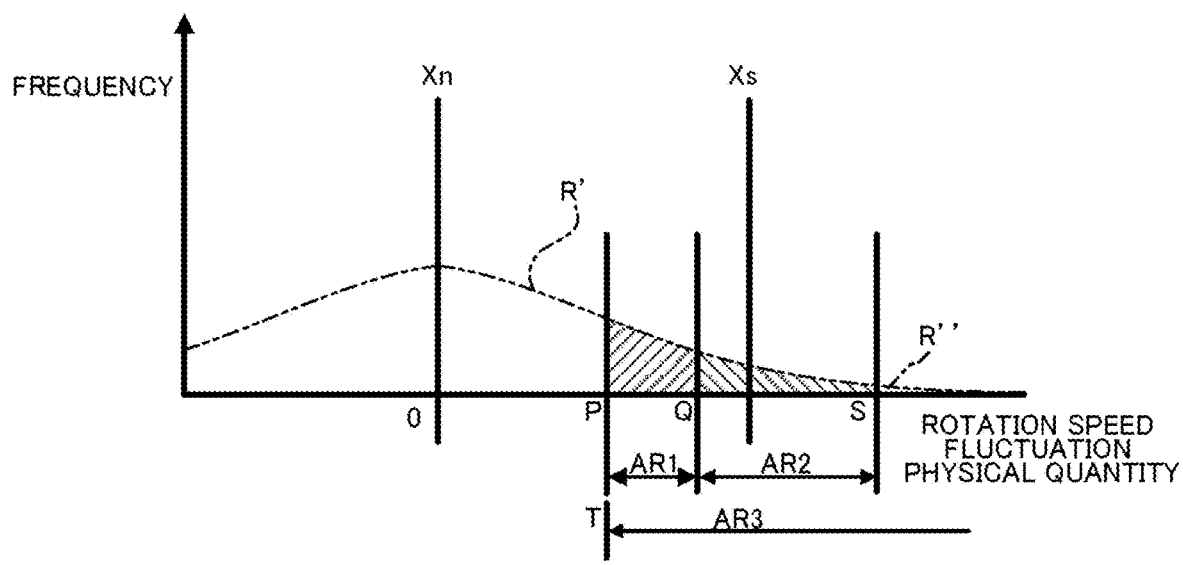

Next, another example of the rough road traveling determination process and the misfire determination process will be described with reference to FIGS. 6A AND 6B. In FIG. 6A and FIG. 6B, configurations and elements identical to those in FIG. 5A to FIG. 5C are given the same reference signs as in FIG. 5A to FIG. 5C. The following description deals with differences from FIG. 5A to FIG. 5C.

In an example shown in FIGS. 6A AND 6B, the rough road determination region (AR1 and AR2) has an upper limit value S, as shown in FIG. 6A. The second region AR2 is between the boundary value Q and the upper limit value S. The upper limit value S is set such that, for example, a distance (difference) between the lower limit value P and the peak Xs is equal to or substantially equal to a distance (difference) between the upper limit value S and the peak Xs. The second region AR2 includes the peak Xs, and is larger than the region AR1.

FIG. 6B shows an exemplary distribution of the fluctuation amount on a rough road. A distribution R' of the fluctuation amount on a rough road shown in FIG. 6B has a wider tail and a lower peak than those of the distribution R. That is, the rough road related to the distribution R' has a road surface condition that gives a larger dispersion to a rotation speed fluctuation amount distribution as compared to the distribution R. Consequently, in an example shown in FIG. 6B, a distribution included in the rough road determination region (AR1 and AR2) is larger as compared to an example shown in FIG. 6A.

In the example shown in FIG. 6B, a distribution R" located in a region corresponding to values exceeding the upper limit value S is not included in the second region AR2, and therefore a distribution in the second region AR2 is reduced. Thus, a distribution in the first region AR1 is likely to be larger than a distribution in the second region AR2 in a case where the vehicle 1 is traveling on a rough road having such a surface condition that a large dispersion occurs in the rotation speed fluctuation amount distribution. This makes it possible to enhance a rough road traveling state detection accuracy. Here, it may be acceptable that the misfire determination region AR3 has an upper limit value.

Figure 7A:
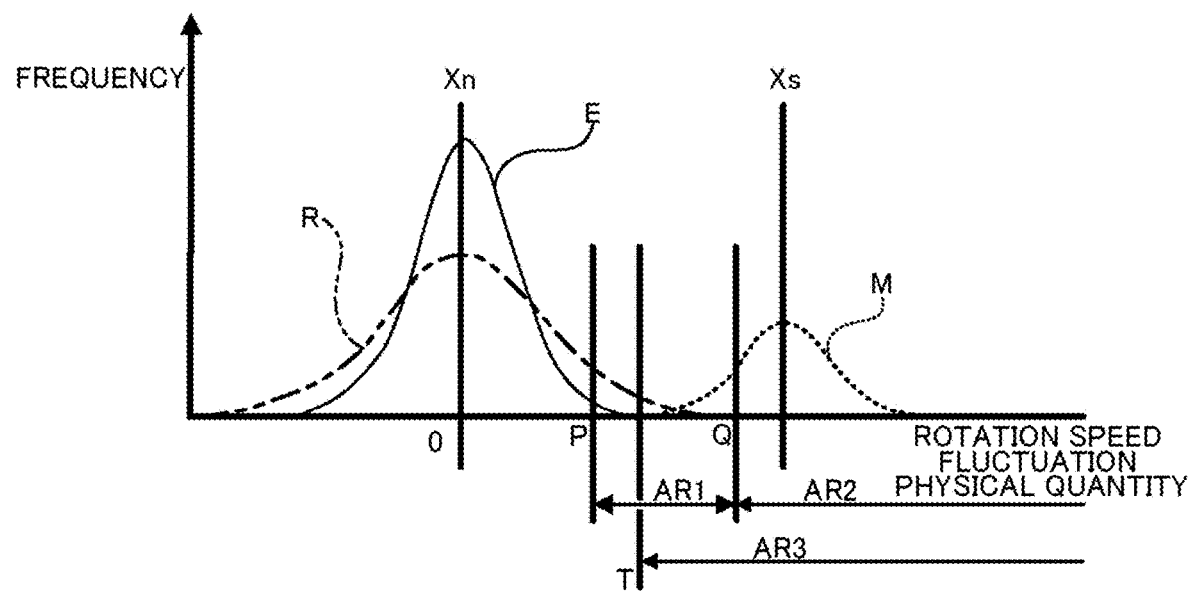
FIGS. 7A and 7B are explanatory diagrams concerning a rough road traveling determination process and a misfire determination process.
Figure 7B:
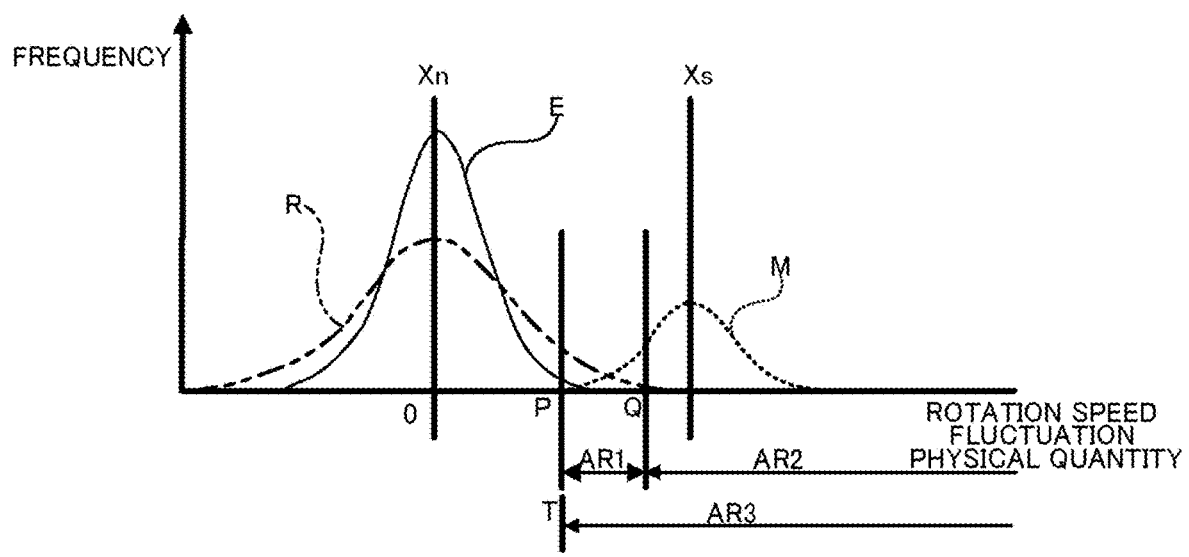

Next, another example of the rough road traveling determination process and the misfire determination process will be described with reference to FIGS. 7A and 7B. In FIG. 7A and FIG. 7B, configurations and elements identical to those in FIG. 5A to FIG. 5C are given the same reference signs as in FIG. 5A to FIG. 5C. The following description deals with differences from FIG. 5A to FIG. 5C.

In an example shown in FIG. 7A, the lower limit value T of the misfire determination region is set in the same manner as in the examples shown in FIGS. 5A to 5C and FIGS. 6A and 6B, and the lower limit value P of the rough road determination region is set smaller than those in the examples shown in FIGS. 5A TO 5C and FIGS. 6A AND 6B. In the example shown in FIG. 7A, therefore, the first region AR1 is large. Thus, in the rough road traveling determination process, a distribution in the first region AR1 is likely to be larger than a distribution in the second region AR2. This makes it possible to enhance a rough road traveling state detection accuracy.

In an example shown in FIG. 7B, a distance between the peaks Xn, Xs of the respective distributions E, M is short. The distance between the peaks Xn, Xs varies depending on, for example, specifications of the vehicle 1, a traveling state (a load and a rotation speed) of the vehicle 1, and a road surface condition. Thus, the distance between the peaks Xn, Xs may be reduced as shown in FIG. 7B. To deal with such a narrow distance between peaks, the lower limit values P, T are set small in the example shown in FIG. 7B. More specifically, both of the lower limit values P, T are set smaller than those in the examples shown in FIGS. 5A TO 5C and FIGS. 6A AND 6B. As a result, the region AR1 is narrower as compared to FIG. 7A. Since the region (AR1, AR2) used for the rough road traveling determination process and the region (AR3) used for the misfire determination process are separately set so as to overlap each other, both a misfire detection accuracy and a rough road traveling state detection accuracy can be enhanced even though the first region AR1 is set close to the peak Xn.

As thus far described, in the vehicle 1 according to the embodiment, the crankshaft 15 has a low moment of inertia, and the internal combustion engine 2 is configured such that the high load and high rotation speed region HH (see the upper right graph in FIG. 1B, for example) is present in a range of the crankshaft rotation speed and the load during traveling of the vehicle 1, the high load and high rotation speed region HH being a range in which the interval between adjacent tails of the distribution of the crankshaft rotation speed fluctuation amount under a normal state and the distribution of the crankshaft rotation speed fluctuation amount in a case of a misfire occurring is wide. Accordingly, the ECU 20 can distinguish whether the crankshaft rotation speed fluctuation physical quantity acquired by the crankshaft rotation speed fluctuation physical quantity acquisition unit 22 in the high load and high rotation speed region HH is a crankshaft rotation speed fluctuation physical quantity under a normal state (distribution E) or a crankshaft rotation speed fluctuation physical quantity in a case of a misfire occurring (distribution M), with an enhanced accuracy. As a result, a misfire detection accuracy in the high load and high rotation speed region HH can be enhanced.

In the low load and low rotation speed region LL (see the lower left graph in FIG. 1B, for example), the rough road traveling determination unit 26 determines a rough road traveling state, and the ECU 20 suspends a determination of a misfire in the internal combustion engine 2 based on a determination result obtained by the rough road traveling determination unit 26. Thus, a misfire determination is performed when a rough road traveling is not performed. When a rough road traveling is not performed, a distribution of the crankshaft rotation speed fluctuation physical quantity has its tail less extensive. This enables the ECU 20 to accurately distinguish whether the crankshaft rotation speed fluctuation physical quantity acquired by the crankshaft rotation speed fluctuation physical quantity acquisition unit 22 is a crankshaft rotation speed fluctuation physical quantity under a normal state or a crankshaft rotation speed fluctuation physical quantity in a case of a misfire occurring. As a result, a misfire detection accuracy can be obtained in the low load and low rotation speed region LL as well.

In a region other than the low load and low rotation speed region LL and than the high load and high rotation speed region HH, the suspension of a determination of a misfire in the internal combustion engine 2 based on a determination result obtained by the rough road traveling determination unit 26 may either be applied or not be applied. Whether or not to apply it can be set in accordance with characteristics of the internal combustion engine 2. This can maintain or enhance a misfire detection accuracy.

The fluctuation physical quantity DOMG of this embodiment is one example of the crankshaft rotation speed fluctuation physical quantity. The crankshaft rotation speed fluctuation physical quantity is not limited to this example. The misfire determination region may be set in accordance with a running status. The misfire determination region may be individually set for each cylinder. The rough road determination region may be set in accordance with a running status. The rough road determination region may be individually set for each cylinder.

The embodiment described above deals with a case where the rough road traveling determination unit 26 (a) determines a rough road traveling state based on a distribution state of the crankshaft rotation speed fluctuation physical quantity acquired by the crankshaft rotation speed fluctuation physical quantity acquisition unit 22. Alternatively, the rough road traveling determination unit 26 may be configured to (b) determine a rough road traveling state based on a detection result obtained by the vehicle traveling state detection unit 28. A physical quantity detected by the vehicle traveling state detection unit 28 is not particularly limited, and examples thereof include a steering angle, a steering torque, a rotation speed of a wheel, a rotational acceleration of a wheel, an amplitude of vibration of a wheel (drive wheel), a frequency of a vehicle speed fluctuation, and the like. The internal combustion engine 2 is configured such that the crankshaft 15 has a low moment of inertia, and the interval between adjacent tails in the high load and high rotation speed region is wider than the interval between adjacent tails in the low load and low rotation speed region. Thus, combining a technique of detecting a misfire based on a crankshaft rotation speed fluctuation with a technique of detecting a rough road traveling state without using a crankshaft rotation speed fluctuation can enhance a misfire detection accuracy at a time of a high load and a high rotation speed while maintaining a misfire detection accuracy at a time of a low load and a low rotation speed, based on a crankshaft rotation speed fluctuation. As the technique of detecting a rough road traveling state without using a crankshaft rotation speed fluctuation, conventionally known techniques are adoptable, as mentioned above.

REFERENCE SIGNS LIST

1 vehicle
2 internal combustion engine
5 engine unit
10 crankshaft signal output
15 crankshaft
20 ECU (misfire detection device)
20a CPU
22 crankshaft rotation speed fluctuation physical quantity acquisition unit
24 misfire determination unit
26 rough road traveling determination unit
28 vehicle traveling state detection unit
30 warning lamp

The invention claimed is:
1. An engine unit, comprising:
an internal combustion engine including a crankshaft and a crank angle signal output unit that periodically outputs a crank angle signal in accordance with a rotation of the crankshaft; and
a misfire detection device including a crankshaft rotation speed fluctuation physical quantity acquisition unit and a misfire determination unit, the crankshaft rotation speed fluctuation physical quantity acquisition unit being configured to acquire a crankshaft rotation speed fluctuation physical quantity in relation to an amount of fluctuation in a rotation speed of the crankshaft based on a signal from the crank angle signal output unit, the misfire determination unit being configured to determine a misfire state of the internal combustion engine based on the crankshaft rotation speed fluctuation physical quantity acquired by the crankshaft rotation speed fluctuation physical quantity acquisition unit,
the internal combustion engine being configured such that
a relationship between the crankshaft rotation speed fluctuation physical quantity and a frequency of an occurrence thereof is characterized by a first distribution indicating operation of the crankshaft in a normal state without a misfire, and a second distribution indicating operation of the crankshaft in the misfire state in which a misfire occurs,
an interval between a first tail of the first distribution of the crankshaft rotation speed fluctuation physical quantity and an adjacent second tail of the second distribution of the crankshaft rotation speed fluctuation physical quantity widens as a load increases and narrows as the rotation speed of the crankshaft increases, and
a low load and low rotation speed region in which the interval between the adjacent first and second tails is relatively narrow and a high load and high rotation speed region in which the interval between the adjacent first and second tails is relatively wide are present in a range of the rotation speed of the crankshaft and the load during traveling of a vehicle; and
the misfire detection device further including a rough road traveling determination unit that
(a) determines a determination result indicating a rough road traveling state based on a distribution state of the crankshaft rotation speed fluctuation physical quantity acquired by the crankshaft rotation speed fluctuation physical quantity acquisition unit, the distribution state including the first distribution and the second distribution, or (b) includes a vehicle traveling state detection unit for detecting a physical quantity in relation to a vehicle traveling state except the crankshaft rotation speed fluctuation physical quantity, and determines a rough road traveling state based on a detection result obtained by the vehicle traveling state detection unit, and
suspends a determination of the misfire state in the internal combustion engine based on the determination result obtained by the rough road traveling determination unit, at least in the low load and low rotation speed region having a narrower interval between the adjacent first and second tails as compared to the high load and high rotation speed region.
2. The engine unit according to claim 1, wherein the internal combustion engine is configured such that
in the high load and high rotation speed region, the adjacent first and second tails are distant from each other, and in the low load and low rotation speed region, the adjacent first and second tails overlap each other, or the interval between the adjacent first and second tails is narrower than the interval between the adjacent first and second tails in the high load and high rotation speed region.

3. The engine unit according to claim 2, wherein the misfire determination unit sets a misfire determination region for determining the misfire state in the distribution state of the crankshaft rotation speed fluctuation physical quantity including the first distribution and the second distribution, and determines the misfire state based on the second distribution of the crankshaft rotation speed fluctuation physical quantity included in the misfire determination region, and the rough road traveling determination unit sets a rough road determination region for determining the rough road traveling state in the distribution state of the crankshaft rotation speed fluctuation physical quantity such that the rough road determination region and the misfire determination region at least partially overlap each other, and determines the rough road traveling state based on a portion of the distribution state of the crankshaft rotation speed fluctuation physical quantity included in the rough road determination region.

4. The engine unit according to claim 1, wherein the misfire determination unit sets a misfire determination region for determining the misfire state in the distribution state of the crankshaft rotation speed fluctuation physical quantity including the first distribution and the second distribution, and determines the misfire state based on the second distribution of the crankshaft rotation speed fluctuation physical quantity included in the misfire determination region, and the rough road traveling determination unit sets a rough road determination region for determining the rough road traveling state in the distribution state of the crankshaft rotation speed fluctuation physical quantity such that the rough road determination region and the misfire determination region at least partially overlap each other, and determines the rough road traveling state based on a portion of the distribution state of the crankshaft rotation speed fluctuation physical quantity included in the rough road determination region.

5. An engine unit, comprising:

an internal combustion engine including a crankshaft and a crank angle signal output unit that periodically outputs a crank angle signal in accordance with a rotation of the crankshaft; and a misfire detection device including a crankshaft rotation speed fluctuation physical quantity acquisition unit and a misfire determination unit, the crankshaft rotation speed fluctuation physical quantity acquisition unit being configured to acquire a crankshaft rotation speed fluctuation physical quantity in relation to an amount of fluctuation in a rotation speed of the crankshaft based on a signal from the crank angle signal output unit, the misfire determination unit being configured to determine a misfire state of the internal combustion engine based on the crankshaft rotation speed fluctuation physical quantity acquired by the crankshaft rotation speed fluctuation physical quantity acquisition unit, wherein the internal combustion engine is configured such that a relationship between the crankshaft rotation speed fluctuation physical quantity and a frequency of an occurrence thereof is characterized by a first distribution indicating operation of the crankshaft in a normal state without a misfire, and a second distribution indicating operation of the crankshaft in the misfire state in which a misfire occurs, an interval between a first tail of the first distribution of the crankshaft rotation speed fluctuation physical quantity and an adjacent second tail of the second distribution of the crankshaft rotation speed fluctuation physical quantity widens as a load increases and narrows as the rotation speed of the crankshaft increases, and a low load and low rotation speed region in which the interval between the adjacent first and second tails is relatively narrow and a high load and high rotation speed region in which the interval between the adjacent first and second tails is relatively wide are present in a range of the rotation speed of the crankshaft and the load during traveling of a vehicle, the misfire detection device further includes a rough road traveling determination unit that (a) determines a determination result indicating a rough road traveling state based on a distribution state of the crankshaft rotation speed fluctuation physical quantity acquired by the crankshaft rotation speed fluctuation physical quantity acquisition unit, the distribution state including the first distribution and the second distribution, or (b) includes a vehicle traveling state detection unit for detecting a physical quantity in relation to a vehicle traveling state except the crankshaft rotation speed fluctuation physical quantity, and determines a rough road traveling state based on a detection result obtained by the vehicle traveling state detection unit, and suspends a determination of the misfire state in the internal combustion engine based on the determination result obtained by the rough road traveling determination unit, at least in the low load and low rotation speed region having a narrower interval between the adjacent first and second tails as compared to the high load and high rotation speed region, the misfire determination unit sets a misfire determination region for determining the misfire state in the distribution state of the crankshaft rotation speed fluctuation physical quantity including the first distribution and the second distribution, and determines the misfire state based on the second distribution of the crankshaft rotation speed fluctuation physical quantity included in the misfire determination region, the rough road traveling determination unit sets a rough road determination region for determining the rough road traveling state in the distribution state of the crankshaft rotation speed fluctuation physical quantity such that the rough road determination region and the misfire determination region at least partially overlap each other, and determines the rough road traveling state based on a portion of the distribution state of the crankshaft rotation speed fluctuation physical quantity included in the rough road determination region, and the rough road traveling determination unit is configured to set the rough road determination region such that at least a part of the rough road determination region is located between two adjacent peaks comprising a first peak of the first distribution and a second peak of the second distribution, the second peak being adjacent to the first peak in the distribution state of the crankshaft rotation speed fluctuation physical quantity, and determine the rough road traveling state based on the portion of the distribution state of the crankshaft rotation speed fluctuation physical quantity included in the rough road determination region, by using a difference between the first distribution and the second distribution in which, in a region between the two adjacent peaks, the first distribution of the crankshaft rotation speed fluctuation physical quantity in the normal state decreases in a direction away from the first peak, and the second distribution of the crankshaft rotation speed fluctuation physical quantity in the misfire state increases in the direction away from the first peak.

6. A vehicle, comprising:

an engine unit, including an internal combustion engine including a crankshaft and a crank angle signal output unit that periodically outputs a crank angle signal in accordance with a rotation of the crankshaft; and a misfire detection device including a crankshaft rotation speed fluctuation physical quantity acquisition unit and a misfire determination unit, the crankshaft rotation speed fluctuation physical quantity acquisition unit being configured to acquire a crankshaft rotation speed fluctuation physical quantity in relation to an amount of fluctuation in a rotation speed of the crankshaft based on a signal from the crank angle signal output unit, the misfire determination unit being configured to determine a misfire state of the internal combustion engine based on the crankshaft rotation speed fluctuation physical quantity acquired by the crankshaft rotation speed fluctuation physical quantity acquisition unit, wherein the internal combustion engine is configured such that
  a relationship between the crankshaft rotation speed fluctuation physical quantity and a frequency of an occurrence thereof is characterized by a first distribution indicating operation of the crankshaft in a normal state without a misfire, and a second distribution indicating operation of the crankshaft in the misfire state in which a misfire occurs, an interval between a first tail of the first distribution of the crankshaft rotation speed fluctuation physical quantity and an adjacent second tail of the second distribution of the crankshaft rotation speed fluctuation physical quantity widens as a load increases and narrows as the rotation speed of the crankshaft increases, and a low load and low rotation speed region in which the interval between the adjacent first and second tails is relatively narrow and a high load and high rotation speed region in which the interval between the adjacent first and second tails is relatively wide are present in a range of the rotation speed of the crankshaft and the load during traveling of the vehicle, and the misfire detection device further includes a rough road traveling determination unit that (a) determines a determination result indicating a rough road traveling state based on a distribution state of the crankshaft rotation speed fluctuation physical quantity acquired by the crankshaft rotation speed fluctuation physical quantity acquisition unit, the distribution state including the first distribution and the second distribution, or (b) includes a vehicle traveling state detection unit for detecting a physical quantity in relation to a vehicle traveling state except the crankshaft rotation speed fluctuation physical quantity, and determines a rough road traveling state based on a detection result obtained by the vehicle traveling state detection unit, and suspends a determination of the misfire state in the internal combustion engine based on the determination result obtained by the rough road traveling determination unit, at least in the low load and low rotation speed region having a narrower interval between the adjacent first and second tails as compared to the high load and high region.

* * * * *